US012659485B2

(12) United States Patent
Li et al.

(10) Patent No.: US 12,659,485 B2
(45) Date of Patent: *Jun. 16, 2026

(54) CONSTRAINED TEMPLATE MATCHING

(71) Applicant: Tencent America LLC, Palo Alto, CA (US)

(72) Inventors: Xiang Li, Saratoga, CA (US); Lien-Fei Chen, Hsinchu (TW); Guichun Li, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,979

(22) Filed: May 31, 2024

(65) Prior Publication Data

US 2024/0323386 A1    Sep. 26, 2024

Related U.S. Application Data

(63) Continuation of application No. 17/942,036, filed on Sep. 9, 2022, now Pat. No. 12,034,932.

(Continued)

(51) Int. Cl.
H04N 19/132 (2014.01)
H04N 19/105 (2014.01)
(Continued)

(52) U.S. Cl.
CPC ......... H04N 19/132 (2014.11); H04N 19/105 (2014.11); H04N 19/137 (2014.11); H04N 19/159 (2014.11); H04N 19/176 (2014.11)

(58) Field of Classification Search
CPC .. H04N 19/132; H04N 19/105; H04N 19/137; H04N 19/159; H04N 19/176; H04N 19/52
See application file for complete search history.

(56) References Cited

U.S. PATENT DOCUMENTS

2019/0124350 A1    4/2019  Thirumalai et al.
2019/0313115 A1   10/2019  Chao et al.
(Continued)

FOREIGN PATENT DOCUMENTS

EP        4156682 A1    3/2023
EP        4364421 A1    5/2024
WO   2019/032765 A1    2/2019

OTHER PUBLICATIONS

Chang, et al., "Compression efficiency methods beyond VVC", ISO/IEC JTC1/SC29/WG11 JVET-U0100, Jan. 2021, pp. 1-13.
(Continued)

*Primary Examiner* — Hesham K Abouzahra
(74) *Attorney, Agent, or Firm* — ARENTFOX SCHIFF LLP

(57) ABSTRACT

An apparatus includes processing circuitry that is configured to determine whether at least one sample of a plurality of samples in a first template of a current block is in an intra coded block that is a spatial neighboring block of the current block, the first template including one or more samples of (1) top neighboring blocks and (2) left neighboring blocks of the current block. The processing circuitry is configured to, when (i) the at least one sample is included in the intra coded block and (ii) a template matching mode is applied to the current block, exclude the at least one sample from the first template to generate a second template for the current block. The processing circuitry is configured to determine a motion vector of the current block based on the second template. The processing circuitry is configured to reconstruct the current block based on the MV.

20 Claims, 19 Drawing Sheets

Related U.S. Application Data

(60) Provisional application No. 63/281,772, filed on Nov. 22, 2021.

(51) Int. Cl.
_H04N 19/137_ (2014.01)
_H04N 19/159_ (2014.01)
_H04N 19/176_ (2014.01)

(56) References Cited

U.S. PATENT DOCUMENTS

| | | | |
|---|---|---|---|
| 2020/0021833 A1 | 1/2020 | Xu et al. | |
| 2020/0374513 A1 | 11/2020 | Xiu et al. | |
| 2021/0014522 A1* | 1/2021 | Jung | H04N 19/593 |

OTHER PUBLICATIONS

Chen, C. et al., "EE2-related: Extension of template matching to Affine, CIIP, GPM merge modes, and boundary sub-blocks", ISO/IEC JTC1/SC29/WG11 JVET-V0118, Apr. 2021, pp. 1-3.

Chen, et al., "Description of SDR, HDR and 360° video coding technology proposal by Qualcomm and Technicolor—low and high complexity versions", ISO/IEC JTC1/SC29/WG11 JVET-J0021, Apr. 2018, pp. 1-43.

High Efficiency Video Coding, Rec. ITU-T H.265 v4 Dec. 2016, pp. 1-664.

International Search Report and Written Opinion issued in International Application No. PCT/US2022/076798, mailed Jan. 4, 2023, 7 pages.

ITU-T and ISO/IEC, "Versatile Video Coding", ITU-T Rec. H.266 and ISO/IEC 23090-3, 2020, pp. 1-516.

Seregin, et al., "Exploration Experiment on Enhanced Compression beyond VVC capability", ISO/IEC JTC1/SC29/WG11 JVET-U2024, Jan. 2021, pp. 1-19.

Extended European Search Report and Search Opinion received for European Application No. 22896617.2, mailed on Feb. 14, 2025, 19 pages.

Yang et al., "CE1:Huawei report on TMDMVD and STDM in HM", 4. JCT-VC Meeting; 95. MPEG Meeting, Daegu, Joint Collaborative Team on Video Coding of ISO/IEC JTC1/SC29/WG11and ITU-T SG.16, No. JCTVC-D295, WG11 No. m19061, XP030008335, Jan. 25, 2011, pp. 1-9.

* cited by examiner

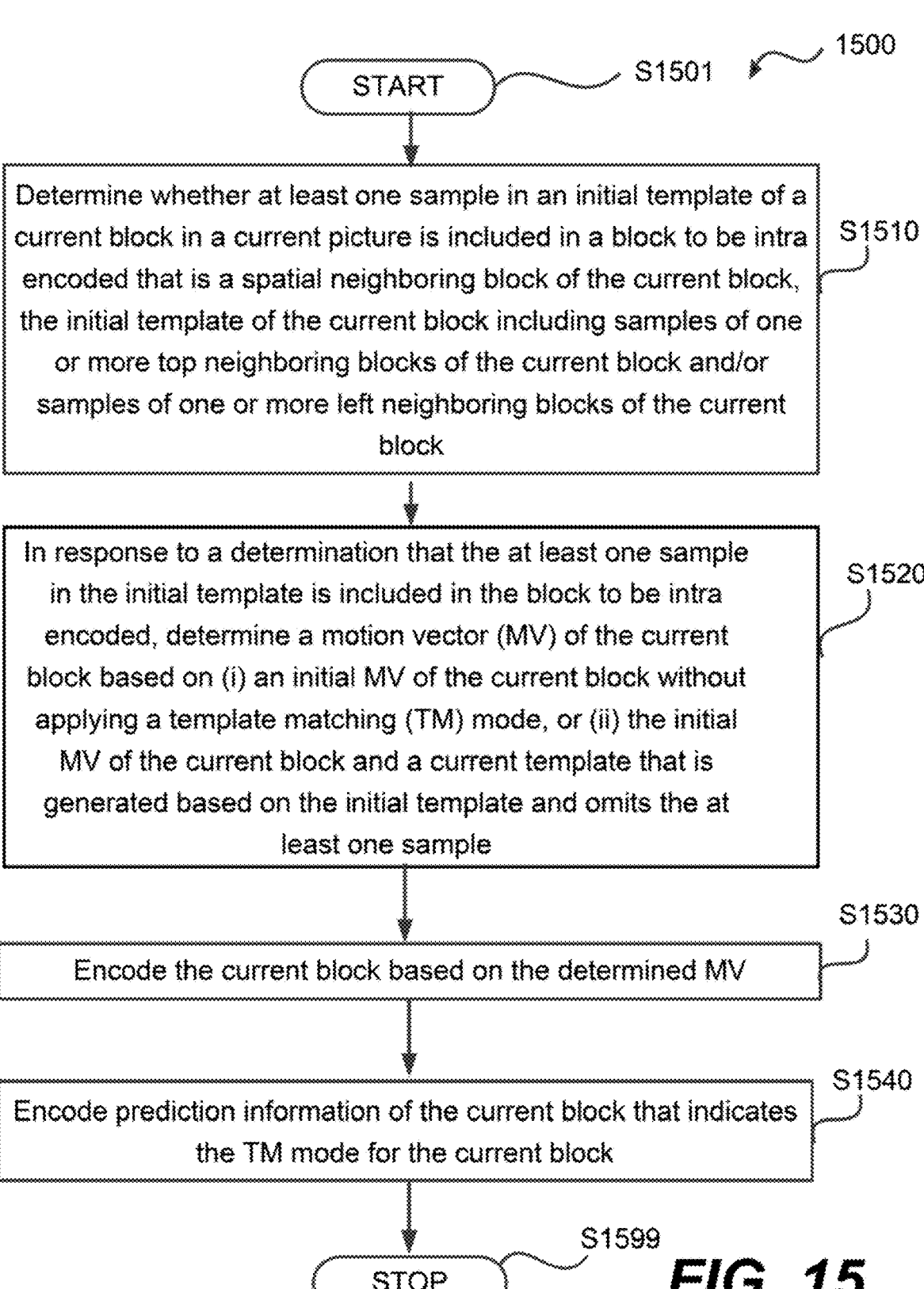

1500

START  S1501

Determine whether at least one sample in an initial template of a current block in a current picture is included in a block to be intra encoded that is a spatial neighboring block of the current block, the initial template of the current block including samples of one or more top neighboring blocks of the current block and/or samples of one or more left neighboring blocks of the current block  S1510

In response to a determination that the at least one sample in the initial template is included in the block to be intra encoded, determine a motion vector (MV) of the current block based on (i) an initial MV of the current block without applying a template matching (TM) mode, or (ii) the initial MV of the current block and a current template that is generated based on the initial template and omits the at least one sample  S1520

Encode the current block based on the determined MV  S1530

Encode prediction information of the current block that indicates the TM mode for the current block  S1540

STOP  S1599

FIG. 15

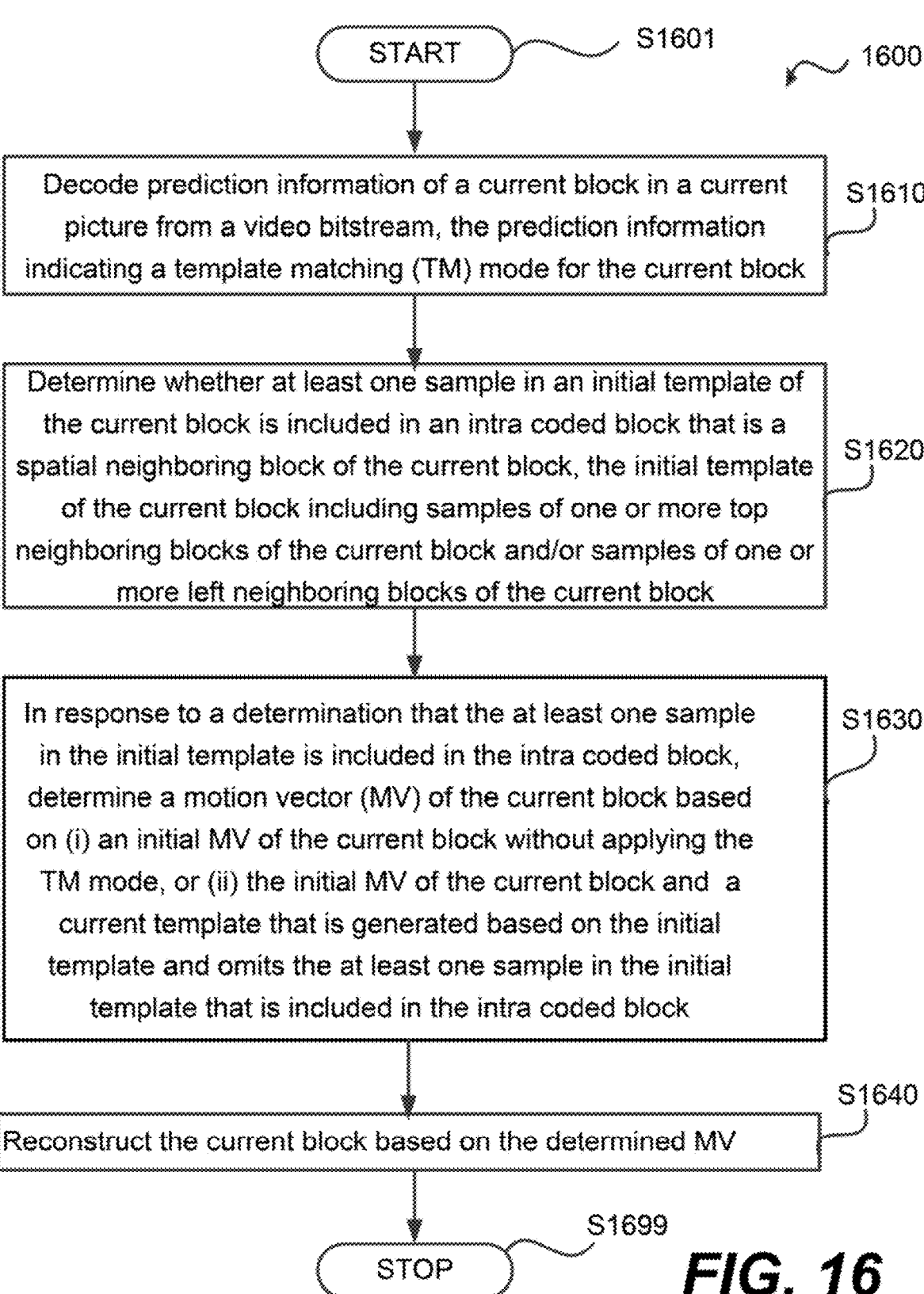

START S1601

1600

S1610
Decode prediction information of a current block in a current picture from a video bitstream, the prediction information indicating a template matching (TM) mode for the current block S1620
Determine whether at least one sample in an initial template of the current block is included in an intra coded block that is a spatial neighboring block of the current block, the initial template of the current block including samples of one or more top neighboring blocks of the current block and/or samples of one or more left neighboring blocks of the current block S1630
In response to a determination that the at least one sample in the initial template is included in the intra coded block, determine a motion vector (MV) of the current block based on (i) an initial MV of the current block without applying the TM mode, or (ii) the initial MV of the current block and a current template that is generated based on the initial template and omits the at least one sample in the initial template that is included in the intra coded block S1640
Reconstruct the current block based on the determined MV

S1699
STOP

*FIG. 16*

CONSTRAINED TEMPLATE MATCHING

INCORPORATION BY REFERENCE

This application is a continuation of U.S. patent application Ser. No. 17/942,036, filed on Sep. 9, 2022, which claims the benefit of priority to U.S. Provisional Application No. 63/281,772, "Constrained Template Matching" filed on Nov. 22, 2021, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry is configured to decode prediction information of a current block in a current picture from a video bitstream. The prediction information indicates a template matching (TM) mode for the current block. The processing circuitry determines whether at least one sample in an initial template (also referred to as a first template) of the current block is included in an intra coded block that is a spatial neighboring block of the current block. The initial template of the current block includes samples of one or more top neighboring blocks of the current block and/or samples of one or more left neighboring blocks of the current block. If the at least one sample in the initial template is included in the intra coded block, the processing circuitry determines a motion vector (MV) of the current block based on (i) an initial MV of the current block without applying the TM mode, or (ii) the initial MV of the current block and a current template (also referred to as a second template) that is generated based on the initial template and omits the at least one sample in the initial template that is included in the intra coded block. The processing circuitry reconstructs the current block based on the determined MV.

In an embodiment, whether the at least one sample in the first template of the current block is included in the intra coded block that is a spatial neighboring block of the current block is determined. The first template of the current block can include one or more samples of (1) the one or more top neighboring blocks of the current block and (2) the one or more left neighboring blocks of the current block. In an example, the one or more top neighboring blocks are top neighboring blocks. In an example, the one or more left neighboring blocks are left neighboring blocks. In response to a determination that the at least one sample in the first template is included in the intra coded block, the at least one sample can be excluded from the first template to generate the second template for the current block. The MV of the current block can be determined based on the second template for the current block.

In an example, in response to (i) the determination that the at least one sample in the first template is included in the intra coded block and (ii) the TM mode being applied to the current block, the at least one sample can be excluded from the first template to generate the second template for the current block.

In an embodiment, the at least one sample in the initial template of the current block is determined to be included in the intra coded block. The processing circuitry determines the MV based on the initial MV of the current block without applying the TM mode.

In an embodiment, the initial template of the current block includes an initial top template including the samples of the one or more top neighboring blocks and an initial left template including the samples of the one or more left neighboring blocks. The at least one sample in the initial template of the current block is determined to be included in the intra coded block. If the one or more left neighboring blocks of the current block does not include the intra coded block, the processing circuitry determines the MV of the current block using the TM mode that is based on the initial MV and the current template consisting of the initial left template. If the one or more top neighboring blocks of the current block does not include the intra coded block, the processing circuitry determines the MV of the current block using the TM mode that is based on the initial MV and the current template consisting of the initial top template.

In an embodiment, the at least one sample in the initial template of the current block is determined to be included in the intra coded block. The processing circuitry determines the MV of the current block using the TM mode that is based on the initial MV and the current template of the current block.

In an embodiment, the processing circuitry generates at least one interpolated sample by interpolation based on one or more samples in the current template. The at least one interpolated sample corresponds to the at least one sample in the initial template that is included in the intra coded block. The current template of the current block further includes the at least one interpolated sample.

In an embodiment, reference samples in a reference template that corresponds to the current template of the current block are located at sub-pixel positions in a reference picture. The processing circuitry generates an interpolated reference template in the reference picture using an inter- polation with a filter having less than four taps on the reference template. The processing circuitry determines the MV of the current block using the TM mode that is based on the initial MV, the current template of the current block, and the interpolated reference template.

In an example, the reference template in the reference picture omits at least one reference sample in the reference picture that corresponds to the at least one sample in the initial template of the current block that is included in the intra coded block. The processing circuitry generates a padded sample that corresponds to one of the omitted at least one reference sample in the reference picture by copying a closest reference sample in the reference picture. The pro- cessing circuitry generates the interpolated reference tem- plate in the reference picture by the interpolation based on the padded sample.

In an example, the reference template in the reference picture omits at least one reference sample in the reference picture that corresponds to the at least one sample in the initial template of the current block that is included in the intra coded block. The processing circuitry generates the interpolated reference template in the reference picture by the interpolation based on the omitted at least one reference sample in the reference picture.

In an embodiment, reference samples in an initial refer- ence template that corresponds to the initial template of the current block are located at sub-pixel positions in a reference picture. The processing circuitry generates an intermediate reference template in the reference picture using an inter- polation on the initial reference template. The processing circuitry generates a reference template that corresponds to the current template of the current block based on the intermediate reference template and a mask. A shape of the mask can be determined based on the current template of the current block.

In an embodiment, the at least one sample in the initial template included in the intra coded block includes (i) one or more left samples of the samples of the one or more left neighboring blocks or (ii) one or more top samples of the samples of the one or more top neighboring blocks. If the at least one sample in the initial template includes the one or more left samples, the current template further includes one or more extended left samples that are adjacent to the samples of the one or more left neighboring blocks included in the current template. The one or more extended left samples are not included in an intra coded block in the current picture.

If the at least one sample in the initial template includes the one or more top samples, the current template further includes one or more extended top samples that are adjacent to the samples of the one or more top neighboring blocks included in the current template. The one or more extended top samples are not included in an intra coded block in the current picture.

In an example, a number of samples in the current template is 150% of a number of samples in the initial template.

In an example, a number of samples in the current template is 200% of a number of samples in the initial template.

Aspects of the disclosure also provide a non-transitory computer-readable storage medium storing a program executable by at least one processor to perform the methods for video decoding.

BRIEF DESCRIPTION OF THE DRAWINGS

Further features, the nature, and various advantages of the disclosed subject matter will be more apparent from the following detailed description and the accompanying draw- ings in which:

FIG. 15 shows a flow chart outlining an encoding process according to an embodiment of the disclosure.

FIG. 16 shows a flow chart outlining a decoding process according to an embodiment of the disclosure.

DETAILED DESCRIPTION OF EMBODIMENTS

Figure 1A:
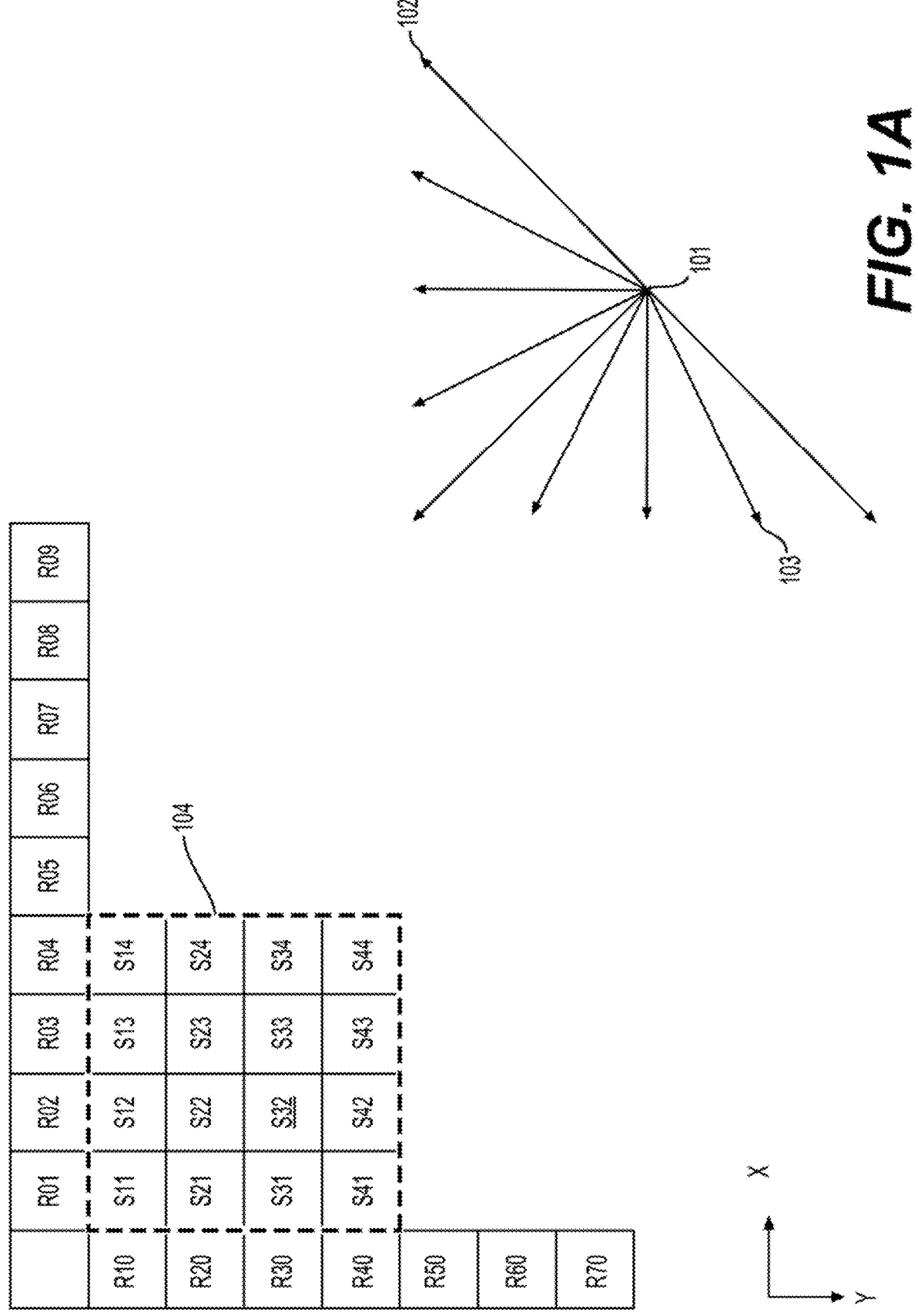
FIG. 1A is a schematic illustration of an exemplary subset of intra prediction modes.
Figure 1B:
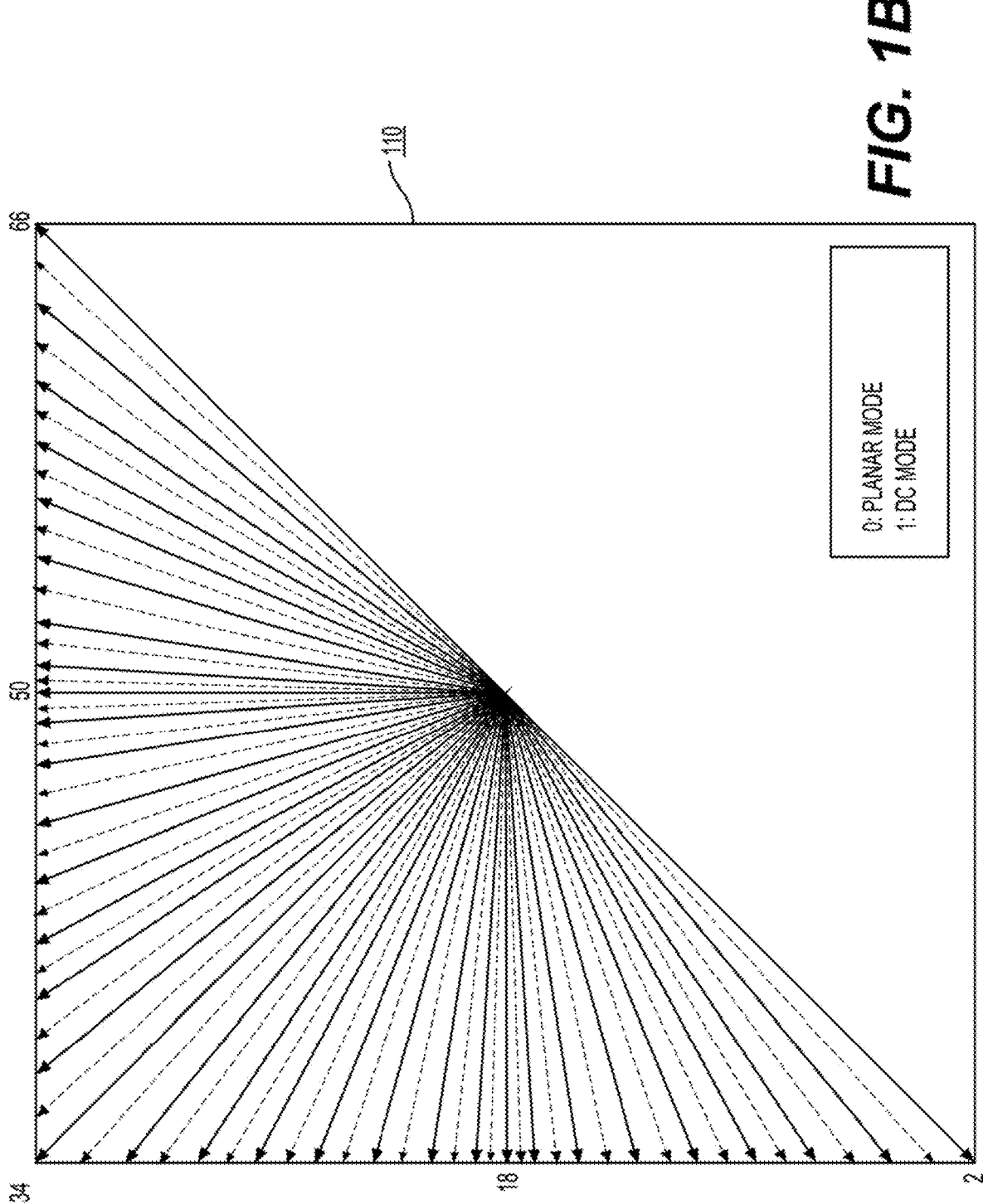
FIG. 1B is an illustration of exemplary intra prediction directions.
Figure 2:
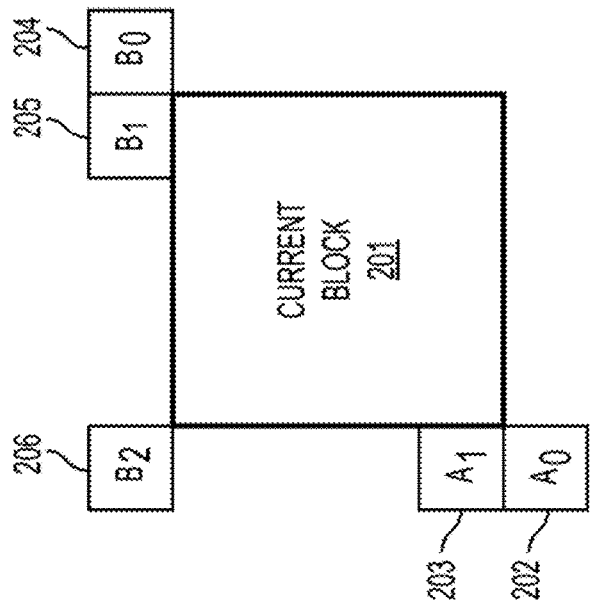
FIG. 2 shows an example of a current block (201) and surrounding samples.
Figure 3:
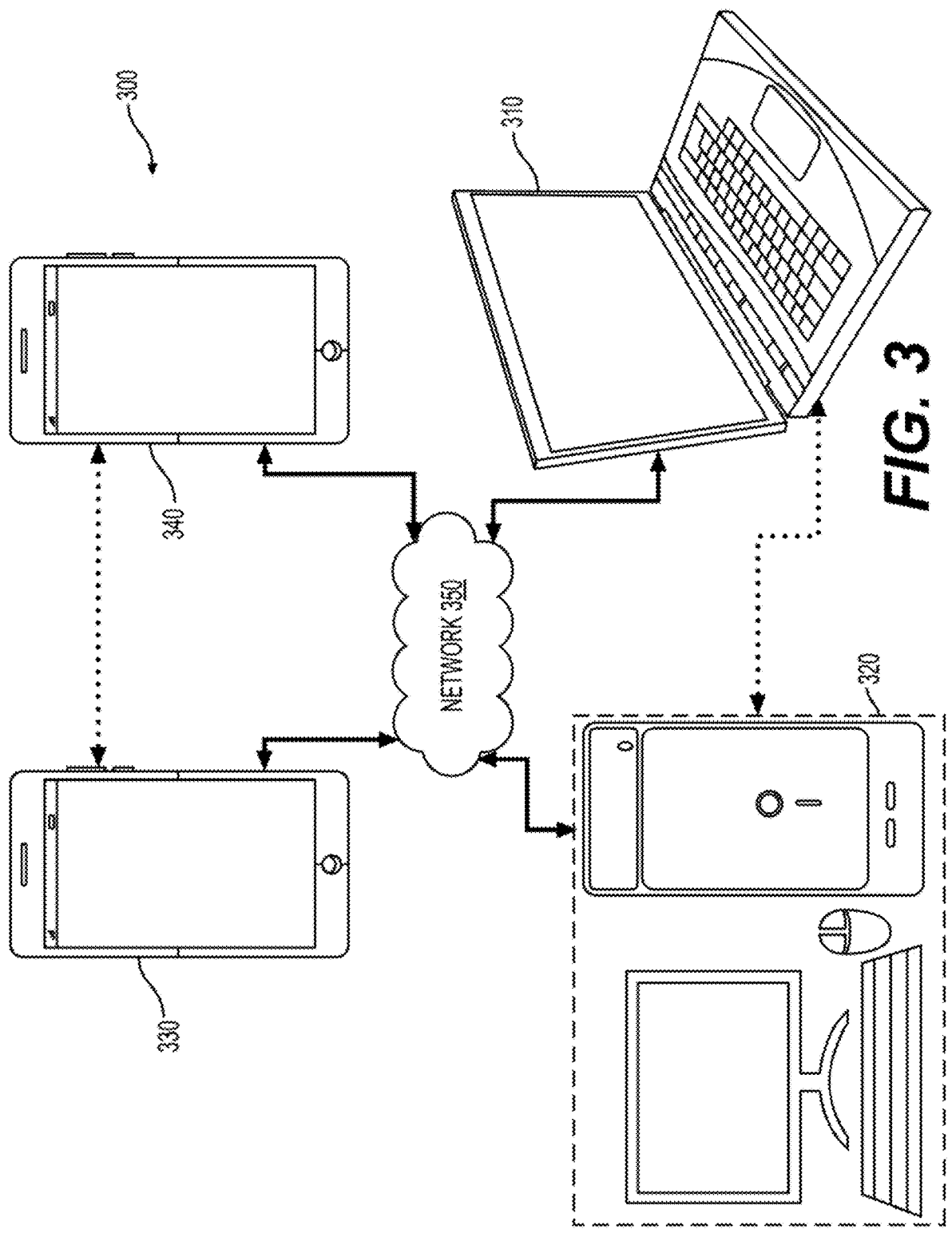
FIG. 3 is a schematic illustration of an exemplary block diagram of a communication system (300).

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
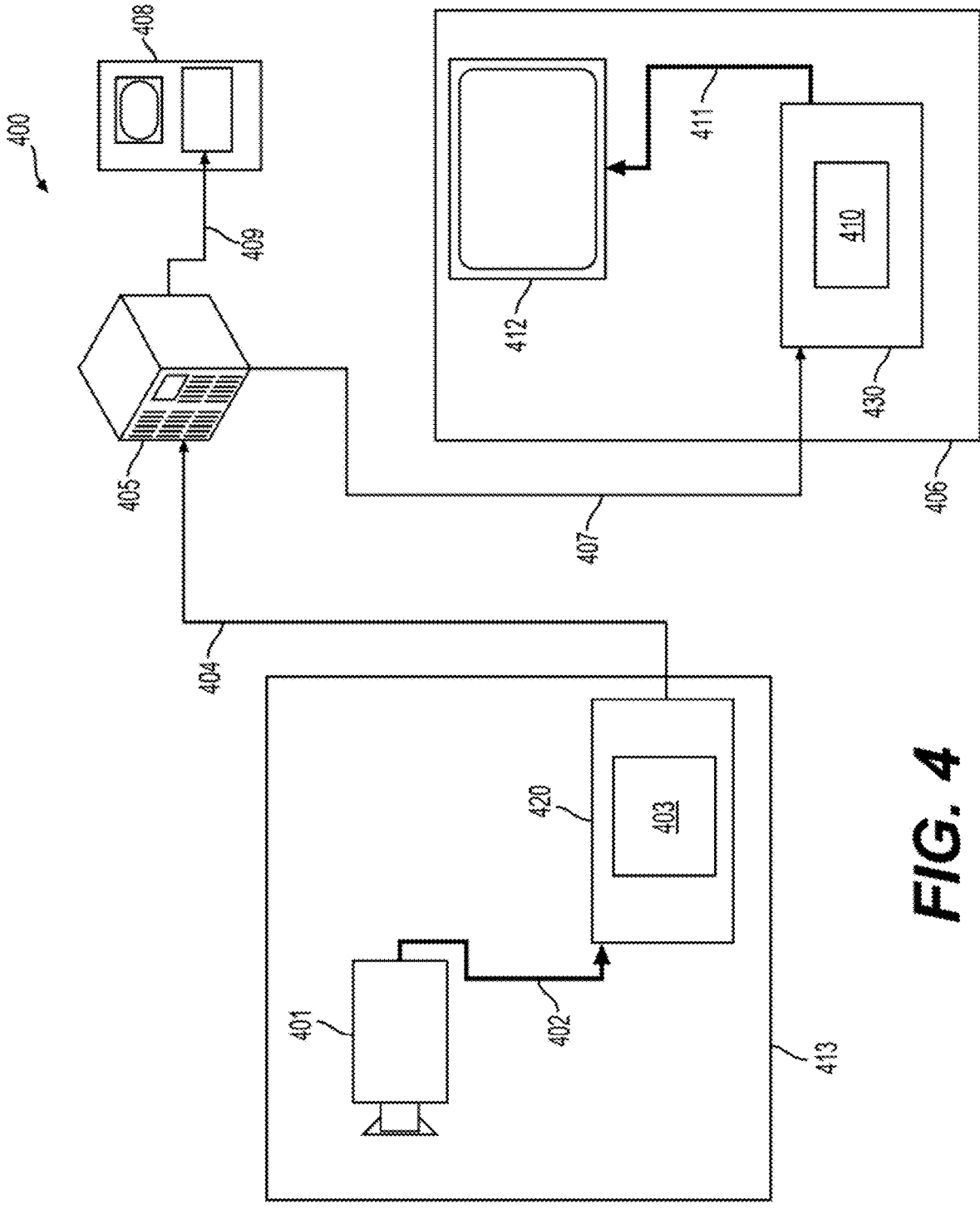
FIG. 4 is a schematic illustration of an exemplary block diagram of a communication system (400).

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
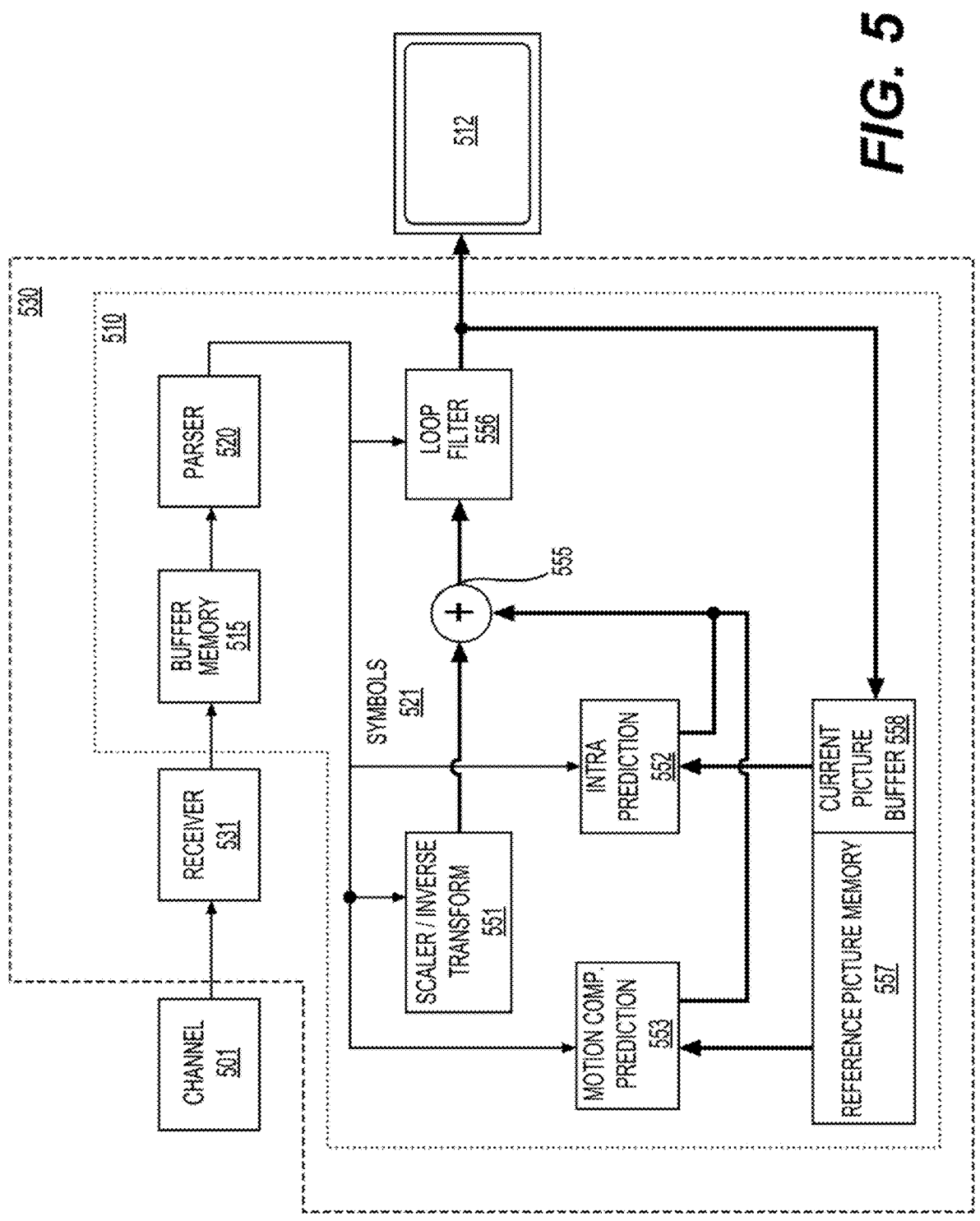
FIG. 5 is a schematic illustration of an exemplary block diagram of a decoder.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
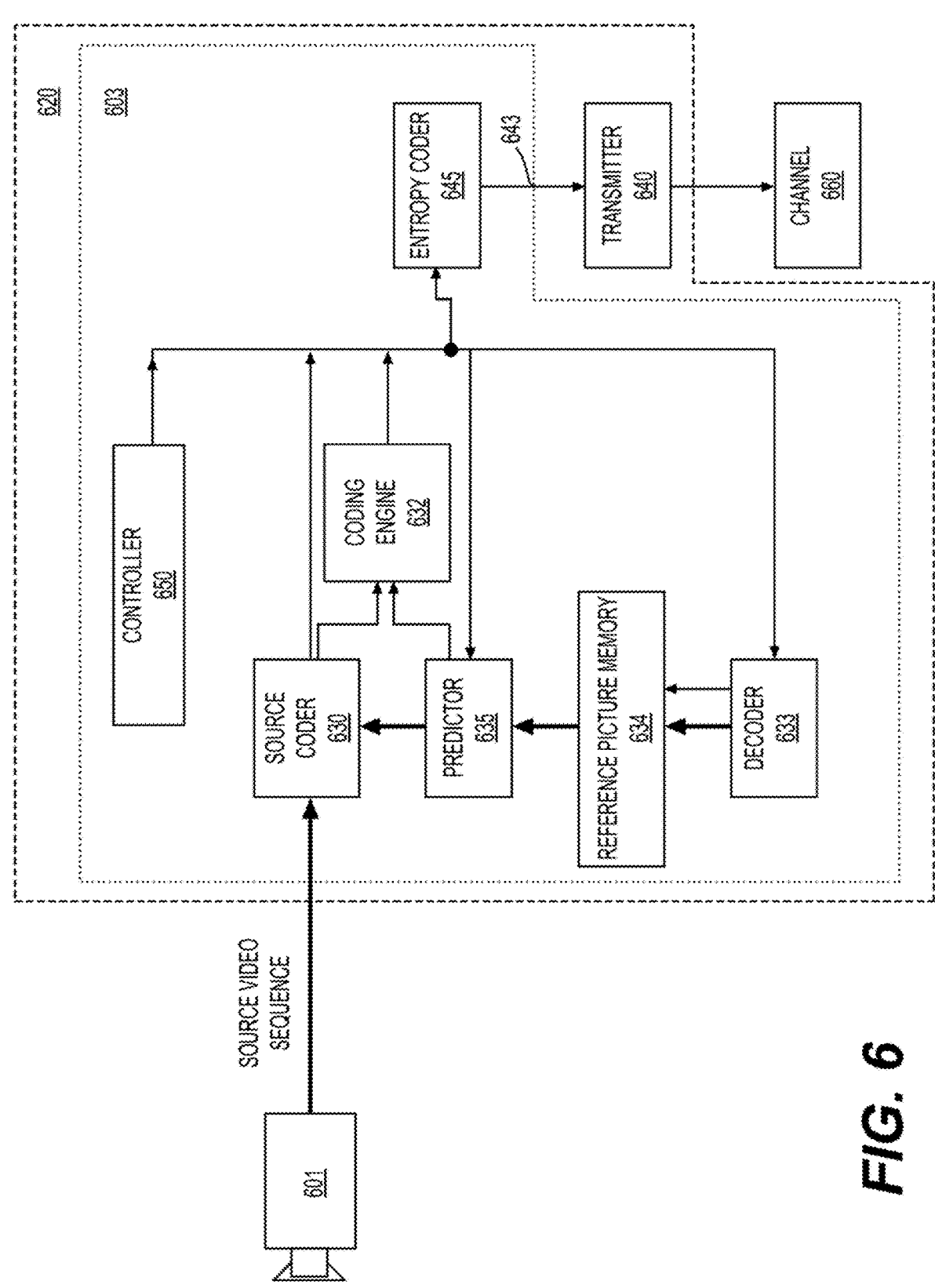
FIG. 6 is a schematic illustration of an exemplary block diagram of an encoder.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
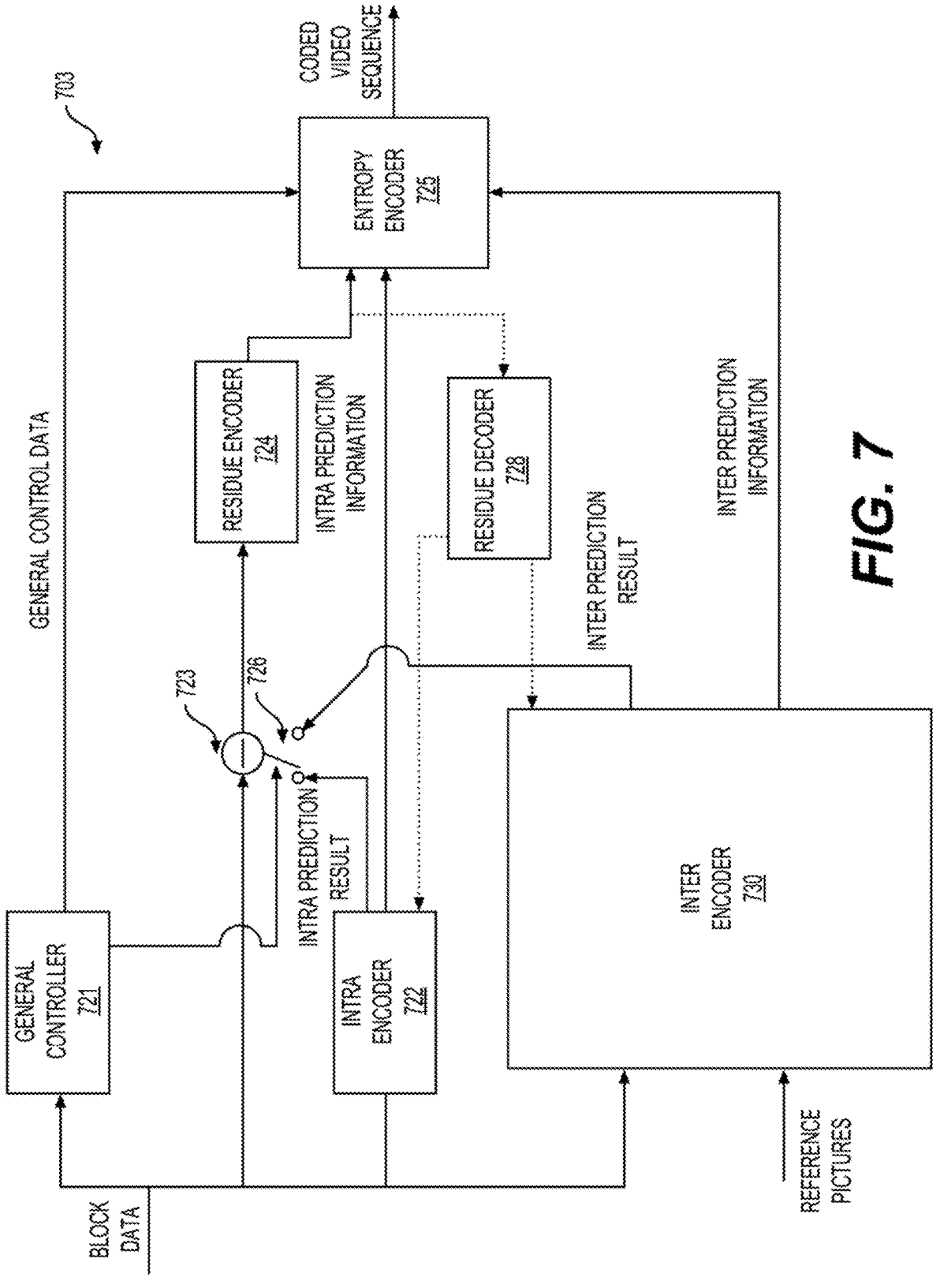
FIG. 7 shows a block diagram of an exemplary encoder.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
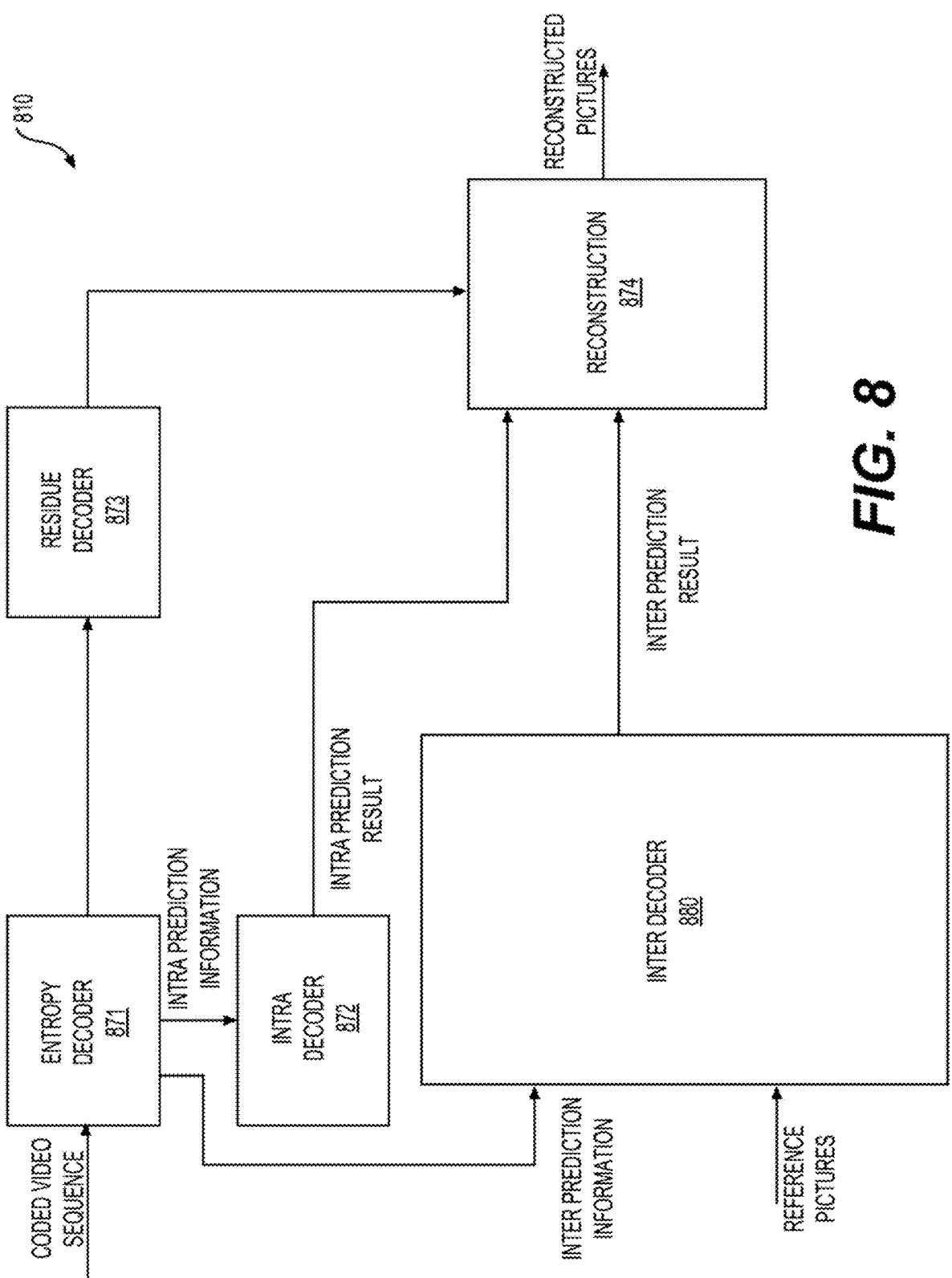
FIG. 8 shows a block diagram of an exemplary decoder.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial candidates, temporal candidates, and/or additional schedules (e.g., schedules introduced in VVC). The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like.

A template matching technique can be used in video/image coding. To further improve the compression efficiency of VVC standard, for example, template matching (TM) can be used to refine an MV. In an example, the TM is used at a decoder side. With the TM mode, an MV can be refined by constructing a template of a block (e.g., a current block) in a current picture to be reconstructed and determine the closest matching between the template of the block in the current picture and a plurality of templates in a reference picture. In an embodiment, the template of the block in the current picture can include left neighboring reconstructed samples of the block and above neighboring reconstructed samples of the block. A template matching technique can be used in video/image coding beyond VVC.

Figure 9:
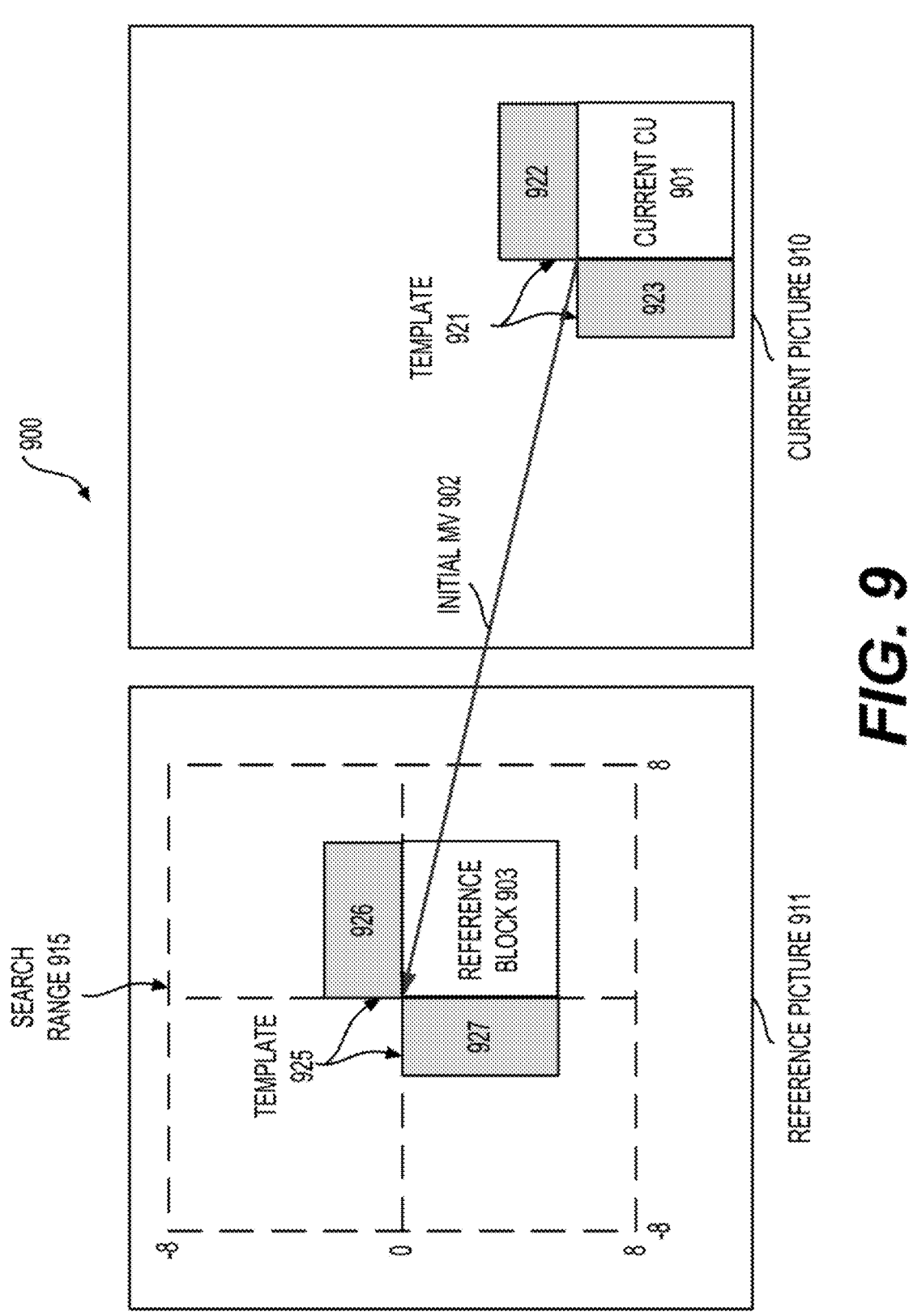
FIG. 9 shows an example of a template matching (TM).

FIG. 9 shows an example of template matching (900). As shown in FIG. 9, template matching can be used to derive motion information of a current CU (901) by determining the closest match between a template (921) of the current CU (901) in a current picture (910) and a template (925) in a reference picture (911). The template (921) of the current CU (901) can have any suitable shape and any suitable size.

In an embodiment, the template (921) of the current CU (901) includes a top template (922) and a left template (923). Each of the top template (922) and the left template (923) can have any suitable shape and any suitable size.

The top template (922) can include samples in one or more top neighboring blocks of the current CU (901). In an example, the top template (922) includes four rows of samples in one or more top neighboring blocks of the current CU (901). The left template (923) can include samples in one or more left neighboring blocks of the current CU (901). In an example, the left template (923) includes four columns of samples in the one or more left neighboring blocks of the current CU (901).

The template (925) in the reference picture (911) corresponds to the template (921) in the current picture (910). In an embodiment, an initial MV (902) points from the current CU (901) to a reference block (903) in the reference picture (911). The template (925) in the reference picture (911) and the template (921) in the current picture (910) can have an identical shape and an identical size. For example, the template (925) includes a top template (926) in the reference picture (911) and a left template (927) in the reference picture (911). The top template (926) can include samples in one or more top neighboring blocks of the reference block (903). The left template (927) can include samples in one or more left neighboring blocks of the reference block (903).

A TM cost can be determined based on the template (921) and the template (925). The TM cost can indicate matching between the template (921) and the template (925). An optimized MV can be determined based on a search around the initial MV (902) of the current CU (901) within a search range (915). The search range (915) in the reference picture (911) can include a [–L, L]-pel range where L is a positive integer, such as 8 (e.g., 8 samples). For example, a difference (e.g., [0, 1]) is determined based on the search range (915), and an intermediate MV is determined by a summation of the initial MV (902) and the difference (e.g., [0, 1]). An intermediate reference block and a corresponding template in the reference picture (911) can be determined based on the intermediate MV. A TM cost can be determined based on the template (921) and the intermediate template in the reference picture (911). The TM costs can correspond to the differences (e.g., [0, 0] corresponding to the initial MV (902), [0, 1], and the like) that are determined based on the search range (915). In an example, the difference corresponding to the smallest TM cost is selected, and the optimized MV is the summation of the difference corresponding to the smallest TM cost and the initial MV (902).

Figure 10:
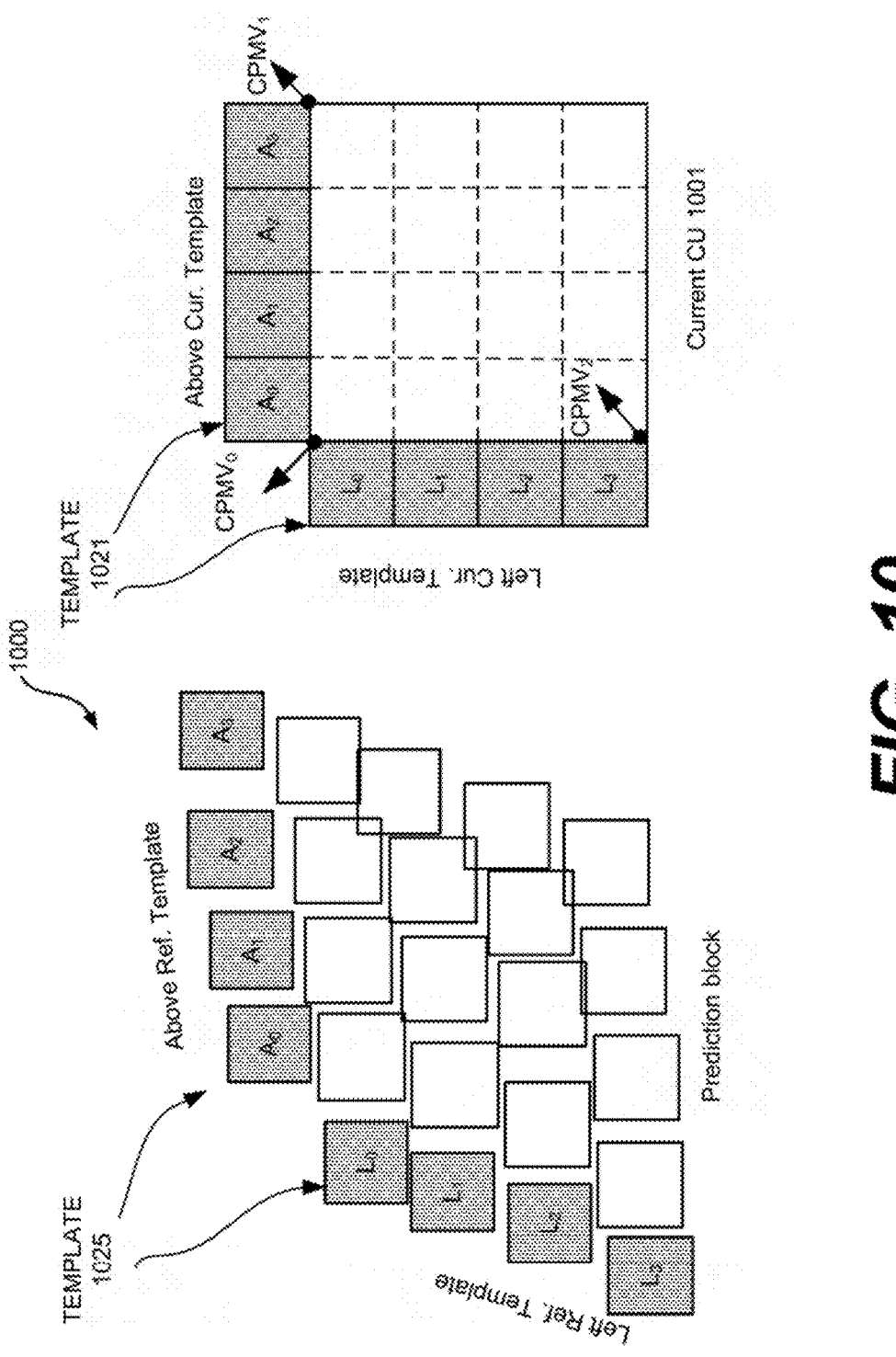
FIG. 10 shows an example of a TM in an affine merge mode.

A TM can be applied in an affine merge mode, and can be referred to as an affine TM. FIG. 10 shows an example of TM (1000) in an affine merge mode. A template (1021) of a current block (e.g., current CU) (1001) can correspond to a template (e.g., the template (921) in FIG. 9) in a TM applied to a translational motion model. A reference template (1025) of a reference block in a reference picture can include multiple subblocks (e.g., 4×4 subblocks) that are pointed by control point MV (CPMV)-derived MVs of neighboring subblocks (e.g., A0-A3 and L0-L3 as shown in FIG. 10) at CU boundaries.

A search process of the TM that is applied in the affine merge mode can start from a CPMV0, while keeping other CPMV(s) (e.g., (i) CPMV1 if a 4-parameter model is used or (ii) CPMV1 and CPMV2 if a 6-parameter model is used) constant. The search can be performed toward a horizontal direction and a vertical direction. In an example, the search is followed by diagonal direction(s) only if a zero vector is not the best difference vector found from the horizontal search and the vertical search. The affine TM can repeat the same search process for the CPMV1. The affine TM can repeat the same search process for CPMV2 if a 6-parameter model is used. Based on the refined CPMVs, the whole search process can restart from the refined CPMV0, if the zero vector is not the best difference vector from the previous iteration and the search process has iterated less than 3 times.

In related template matching methods, a template (e.g., the template (921) or (1021)) of a current block is generated from reconstructed neighboring pixels of the current block. In some examples, additional dependency occurs as TM for the current block cannot be performed until all the neighboring pixels used in the template of the current block have been reconstructed. The additional dependency may not be desirable, for example, for hardware where inter pipelines and intra pipelines are separated. In some examples, the template of the current block includes samples in neighboring blocks that are intra coded (at a decoder side) or to be intra coded (at an encoder side). Thus, at the decoder side, if the intra coded neighboring blocks have not been decoded when the current block is being reconstructed, the samples in the neighboring blocks are not available. Therefore, the reconstruction of the current block cannot be performed until the intra coded neighboring blocks are decoded. The dependency of the template of the current block on the intra coded neighboring blocks can cause delay to the coding of the current block. The present disclosure includes embodiments that can remove the dependency described above and thus reduce such a delay.

The present disclosure includes embodiments related to constrained template matching. According to an embodiment of the disclosure, the derivation of a template of a block (e.g., a current block) in a current picture is constrained such that TM for the block has no dependency on spatially neighboring block(s) that are intra coded.

A template of a current block in a current picture can be generated without using sample(s) (or pixel(s)) from intra coded block(s) in the current picture. Thus, at a decoder side, a decoder does not need to wait for the intra coded block(s) to be decoded before reconstructing the current block with the TM, and a decoding speed can be increased.

In an embodiment, prediction information of the current block in the current picture can be decoded from a video bitstream. The prediction information can indicate the TM mode for the current block. Whether sample(s) in an initial template of the current block is included in an intra coded block that is a spatial neighboring block of the current block can be determined. The initial template of the current block can include samples of one or more top neighboring blocks of the current block and/or samples of one or more left neighboring blocks of the current block. In response to a determination that the sample(s) in the initial template is included in the intra coded block, a MV of the current block can be determined based on (i) an initial MV of the current block without applying the TM mode or (ii) the initial MV of the current block and a current template that is generated based on the initial template and omits the sample(s) in the initial template that is included in the intra coded block. The current block can be reconstructed based on the determined MV.

Figure 11:
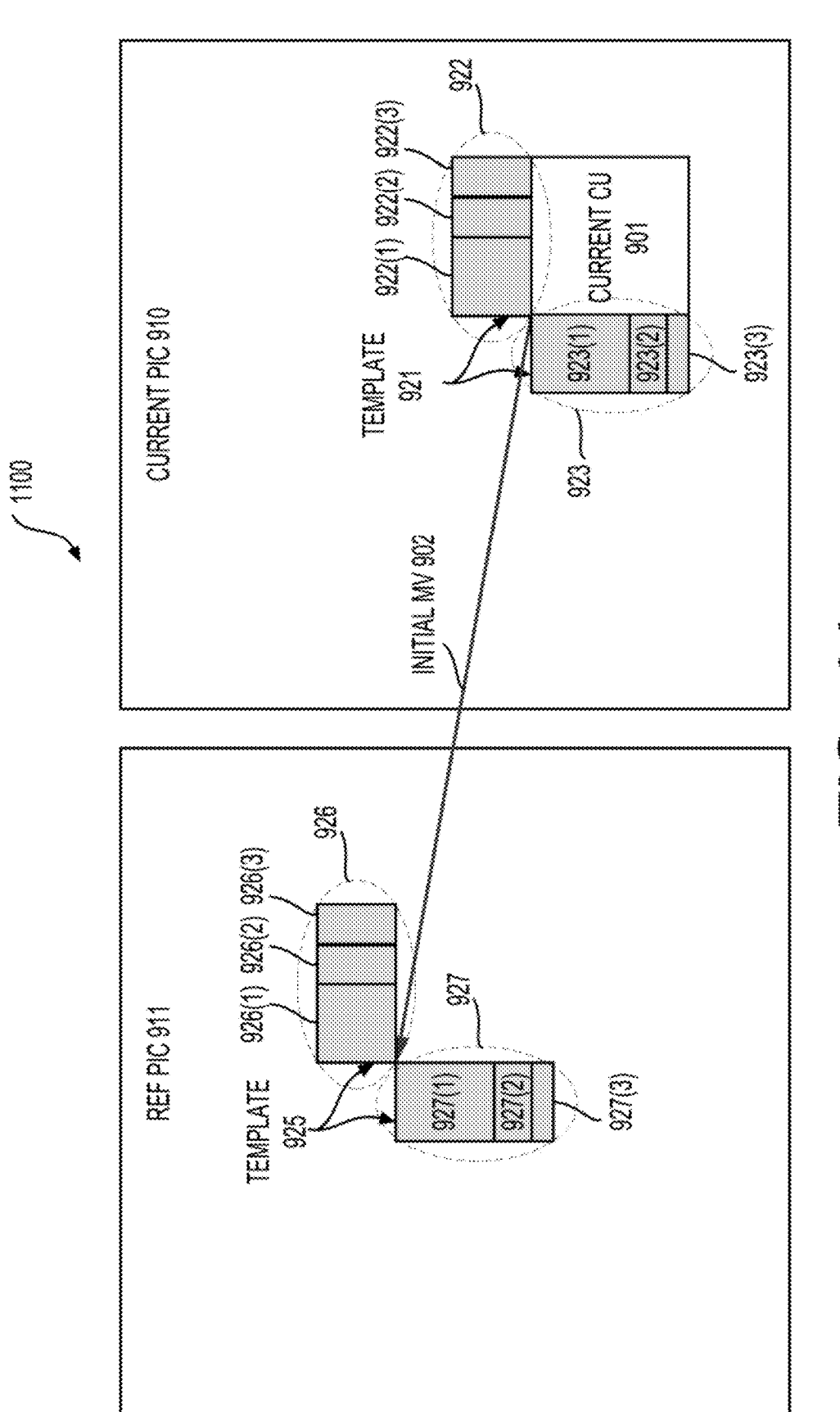
FIG. 11 shows an example of a TM.

FIG. 11 shows an example of template matching (1100). The current CU (901), the template (921), the initial MV (902), the template (925), the current picture (910), and the reference picture (911) in FIG. 11 are described in FIG. 9. The template (921) is the initial template of the current block (e.g., the current CU (901)). In an embodiment, sample(s) in the initial template (e.g., the template (921)) of the current block (e.g., (901)) is determined to be included in an intra coded block. Based on the determination that sample(s) in the initial template is included in an intra coded block, the MV can be determined based on the initial MV (e.g., the initial MV (902)) of the current block (e.g., the current CU (901)) without applying the TM mode. In an example, the MV is the initial MV (e.g., the initial MV (902)) of the current block (e.g., the current CU (901)).

Referring to FIG. 11, in an example, the top template (922) includes sub-templates (922(1)-922(3)), and the left template (923) includes sub-templates (923(1)-923(3)). The sub-templates (922(1)), (922(3)), (923(1)), and (923(3)) do not include sample(s) in intra coded block(s) in the current picture (910). The sub-templates (922(2)) and (923(2)) include samples in intra coded blocks in the current picture (910). In an example, the MV is the initial MV (e.g., the initial MV (902)) of the current block (e.g., the current CU (901)), and the TM is not applied to the current CU (901).

In an example, the samples (or the pixels) used to generate the template (e.g., (921)) of the current block (e.g., (901)) are checked. If any of the pixels in the template (e.g., (921)) of the current block (e.g., (901)) belongs to an intra coded block, the template (e.g., (921)) of the current block (e.g., (901)) is marked as not available where the template (e.g., (921)) includes the top template (e.g., (922)) and the left template (e.g., (923)).

In an example, the top template (e.g., (922)) and the left template (e.g., (923)) are generated separately. The TM may be used when the top template (e.g., (922)) and/or the left template (e.g., (923)) is available. In an example, the top template (e.g., (922)) is available if none of the pixels in the top template (e.g., (922)) belongs to an intra coded block. In an example, the left template (e.g., (923)) is available if none of the pixels in the left template (e.g., (923)) belongs to an intra coded block in the current picture (910).

Referring to FIG. 11, in an example, the initial template (e.g., (921)) of the current block (e.g., (901)) includes an initial top template (e.g., (922)) including the samples of one or more top neighboring blocks and an initial left template (e.g., (923)) including the samples of one or more left neighboring blocks. sample(s) in the initial template (e.g., (921)) of the current block is determined to be included in the intra coded block. In response to the one or more left neighboring blocks of the current block (e.g., (901)) not including the intra coded block, the MV of the current block can be determined using the TM mode that is based on the initial MV (e.g., (902)) and the current template (e.g., (923)) consisting of the initial left template (e.g., (923)). In response to the one or more top neighboring blocks of the current block (e.g., (901)) not including the intra coded block, the MV of the current block can be determined using the TM mode that is based on the initial MV (e.g., (902)) and the current template (e.g., (922)) consisting of the initial top template (e.g., (922)).

In an embodiment, the samples (or the pixels) used to generate the initial template (the template (921)) of the current block (e.g., (901)) are checked. sample(s) belonging to intra coded block(s) can be excluded from the current template of the current block. After excluding the sample(s) from the intra coded block(s) from the current template, corresponding sample(s) in a reference template can be excluded when calculating a matching error between the current template and the reference template.

Figure 12A:
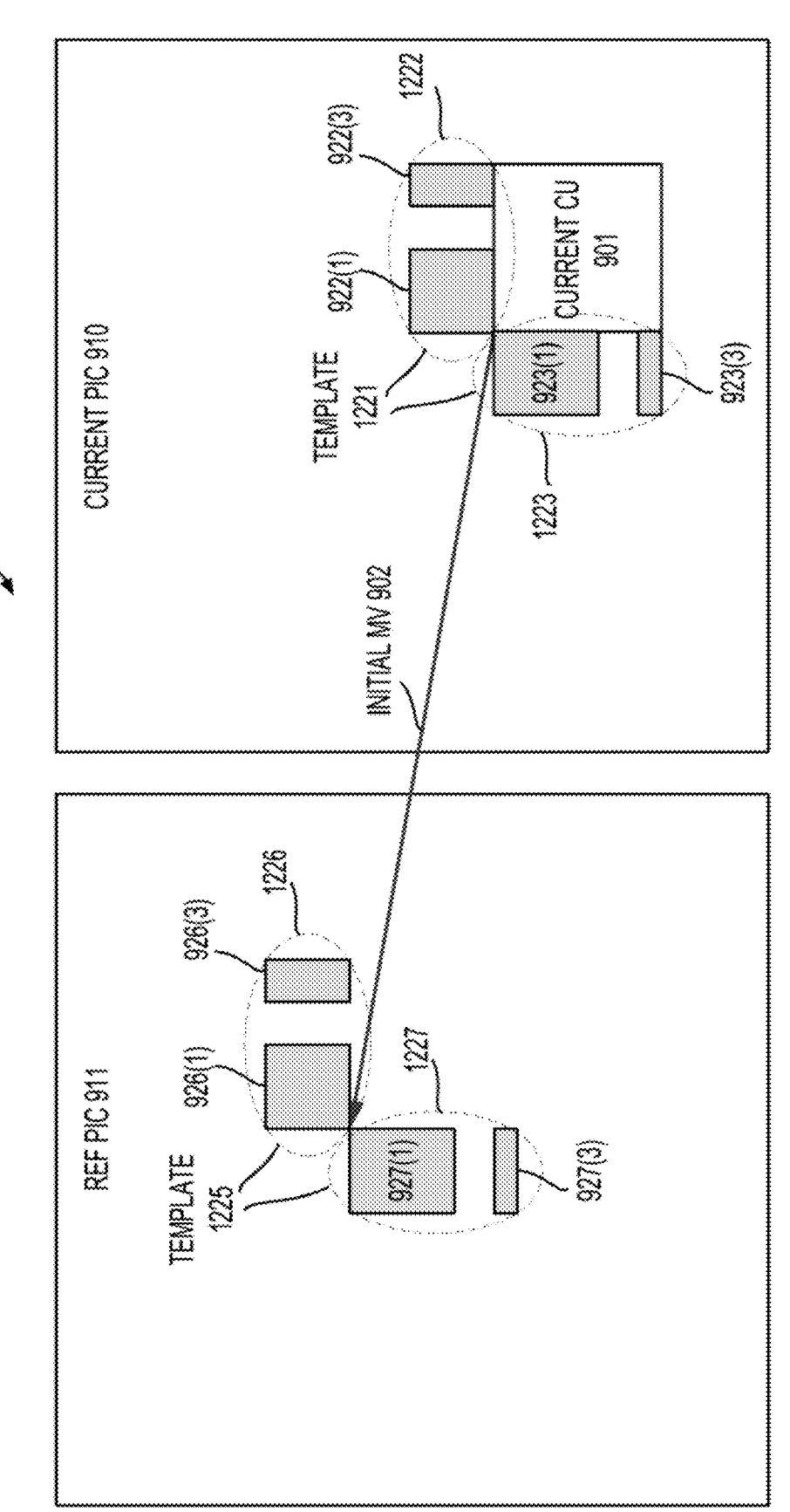
FIG. 12A shows an example of a TM.

FIG. 12A shows an example of TM (1200A) where the current CU (901), the initial MV (902), the current picture (910), the reference picture (911), the sub-templates (922(1)), (922(3)), (923(1)), and (923(3)) in FIG. 12A are described in FIGS. 9 and 11. Referring to FIGS. 11 and 12A, the initial template of the current CU (901) is the template (921). The sample(s) in the initial template (921) of the current CU (901) is determined to be included in the intra coded block(s). The MV of the current CU (901) can be determined using the TM mode that is based on the initial MV (902) and a current template (1221) of the current CU (901). In an example, the sample(s) in the initial template (921) that is included in the intra coded blocks includes samples in the sub-templates (922(2)) and (923(2)). The current template (1221) of the current CU (901) can include the sub-templates (922(1)), (922(3)), (923(1)), and (923(3)). The current template (1221) of the current CU (901) omits the samples in the sub-templates (922(2)) and (923(2)). In an example, the current template (1221) includes samples in inter coded block(s) and/or intra block copy (IBC) coded block(s).

Referring back to FIG. 11, in the reference picture (911), the top template (926) can include sub-templates (926(1))-(926(3)) that correspond to the sub-templates (922(1))-(922(3)), and the left template (927) can include sub-templates (927(1))-(927(3)) that correspond to the sub-templates (923(1))-(923(3)). Referring to FIG. 12A, a reference template (1225) can correspond to the current template (1221) where the reference template (1225) includes the sub-templates (926(1)), (926(3)), (927(1)), and (927(3)). The reference template (1225) omits the sub-templates (926(2)) and (927(2)).

In an example, the current template (1221) includes a top template (1222) and a left template (1223). The top template (1222) includes the sub-templates (922(1)) and (922(3)). The left template (1223) includes the sub-templates (923(1)) and (923(3)). The reference template (1225) includes a top template (1226) and a left template (1227). The top template (1226) includes the sub-templates (926(1)) and (926(3)). The left template (1227) includes the sub-templates (927(1)) and (927(3)).

Figure 12B:
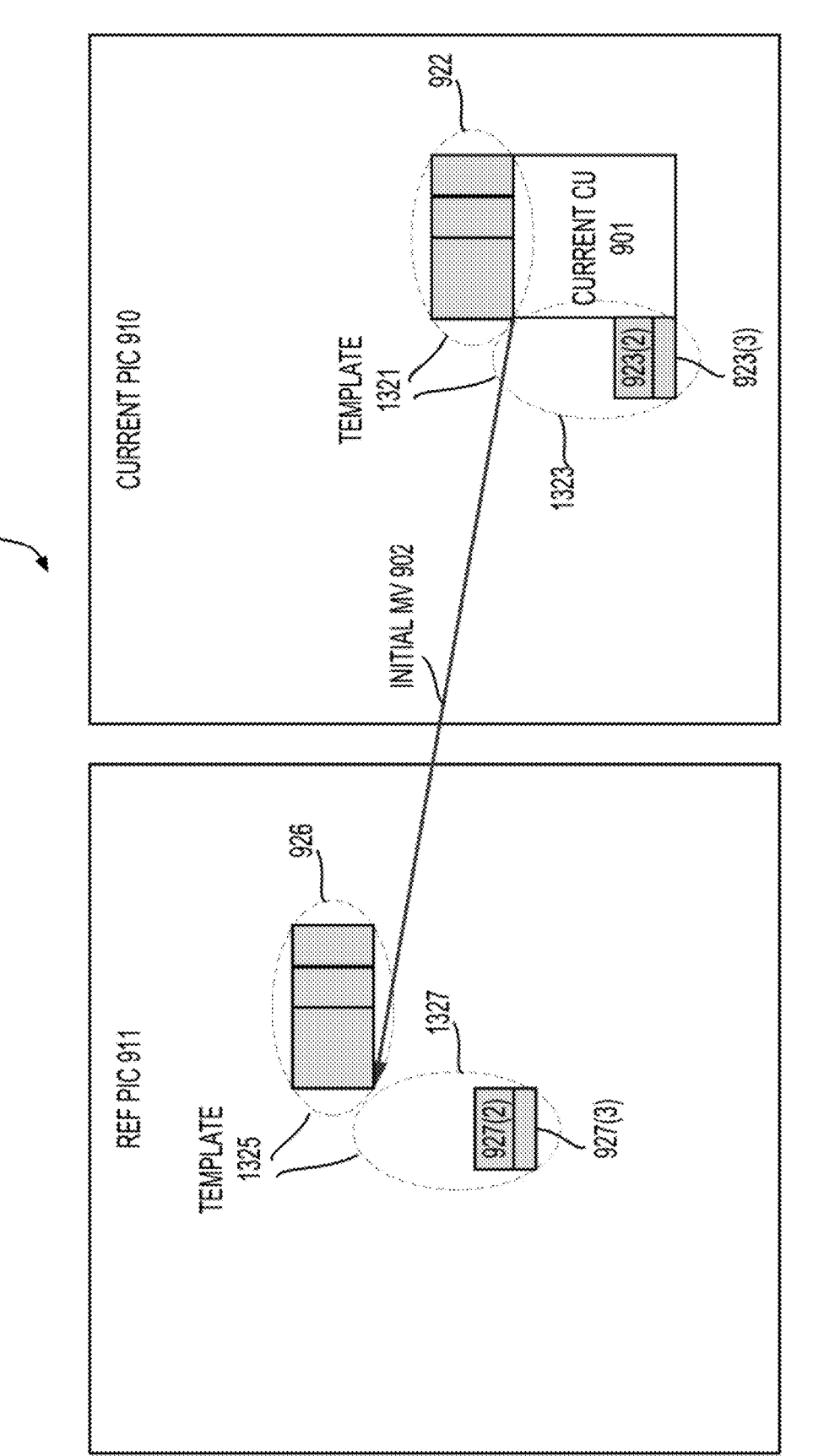
FIG. 12B shows an example of a TM.

A current template of the current CU (901) can include any sample(s) in an initial template of the current CU (901) that are not included in intra coded block(s). The current template of the current CU (901) can omit any sample(s) in the initial template of the current CU (901) that are included in intra coded block(s). FIG. 12B shows an example of a TM (1200B) where the current CU (901), the initial MV (902), the current picture (910), the reference picture (911), the top templates (922) and (926), and the sub-templates (923(2))-(922(3)) and (927(2))-(923(3)) in FIG. 12B are described in FIGS. 9 and 11.

Referring to FIGS. 11 and 12B, the initial template of the current CU (901) is the template (921). The sample(s) in the initial template (921) that are included in intra coded blocks include sample(s) in the sub-template (923(1)). A current template (1321) of the current CU (901) can include the top template (922) and the sub-templates (923(2))-(923(3)). The current template (1321) of the current CU (901) omits the sample(s) in the sub-template (923(1)). A reference template (1325) can correspond to the current template (1321) where the reference template (1325) includes the top template (926) and the sub-templates (927(2))-(927(3)). The reference template (1325) omits the sub-template (927(1)).

In an example, the omitted pixel(s) (e.g., intra coded pixels) in the current template (e.g., the current template (1221) or (1321)) are interpolated based on available pixel(s) in the current template. In an example, interpolated sample(s) can be generated by interpolation based on one or more samples in the current template (e.g., the current template (1221) or (1321)). The interpolated sample(s) can correspond to (replace) sample(s) in the initial template (e.g., (921)) that are included in the intra coded block. The current template of the current block can further include the interpolated sample(s) where the interpolated sample(s) can replace the sample(s) in the initial template (e.g., (921)) that is omitted from the current template.

The omitted pixel(s) (e.g., intra coded pixels) in the reference template (e.g., the reference template (1225) or (1325)) may be interpolated based on available pixel(s) in the reference template.

In an embodiment, reference samples in the reference template (e.g., the reference template (1225) or (1325)) that corresponds to the current template (e.g., the current template (921)) of the current block (e.g., (901)) are located at sub-pixel positions in the reference picture (e.g., (911)). In this case, an interpolated reference template in the reference picture can be generated using an interpolation with a filter having less than four taps on the reference template. The MV of the current block can be determined using the TM mode that is based on the initial MV, the current template of the current block, and the interpolated reference template.

In an example, the reference template in the reference picture omits reference sample(s) in the reference picture that corresponds to sample(s) in the initial template of the current block that is included in the intra coded block. A padded sample that corresponds to (replaces) one of the omitted reference sample(s) in the reference picture can be generated by copying a closest reference sample in the reference picture. The interpolated reference template in the reference picture can be generated by the interpolation based on the padded sample.

In an example, the reference template (e.g., the reference template (1225) or (1325)) is at a sub-pixel position. In this case, interpolation can be performed for the reference template so that the interpolated reference template is at an integer position. The interpolation can be performed for the reference template with a filter having fewer than 4 taps (e.g., a 2-tap bilinear interpolation filter) to reduce complexity. If a part of the reference template is omitted due to the exclusion of intra coded block(s), pixel padding can be performed by copying the closest pixel(s) to make the interpolation. In an example, no more than 2 pixels are padded in a necessary direction.

In an embodiment, the reference template in the reference picture omits reference sample(s) in the reference picture that corresponds to sample(s) in the initial template of the current block that is included in the intra coded block. In this case, an interpolated reference template in the reference picture can be generated by interpolation based on the omitted reference sample(s) in the reference picture.

In an example, pixel padding is not used when the reference template is at a sub-pel position. In this case, interpolation may be based on the pixel(s) which are to be excluded from the matching process because all pixels in the reference picture (e.g., (911)) are available.

In various examples, the current template does not need to be interpolated when pixels in the current template are reconstructed spatial neighbors at integer pixel positions.

In an example, interpolation of the entire reference template in the reference picture is performed at a sub-pel position. A mask can be used for the reference template to exclude pixel(s) in the reference template that correspond to pixel(s) that belong to intra coded block(s) in the current template. A shape and a size of the mask can be based on a shape and a size of the current template.

Figure 13:
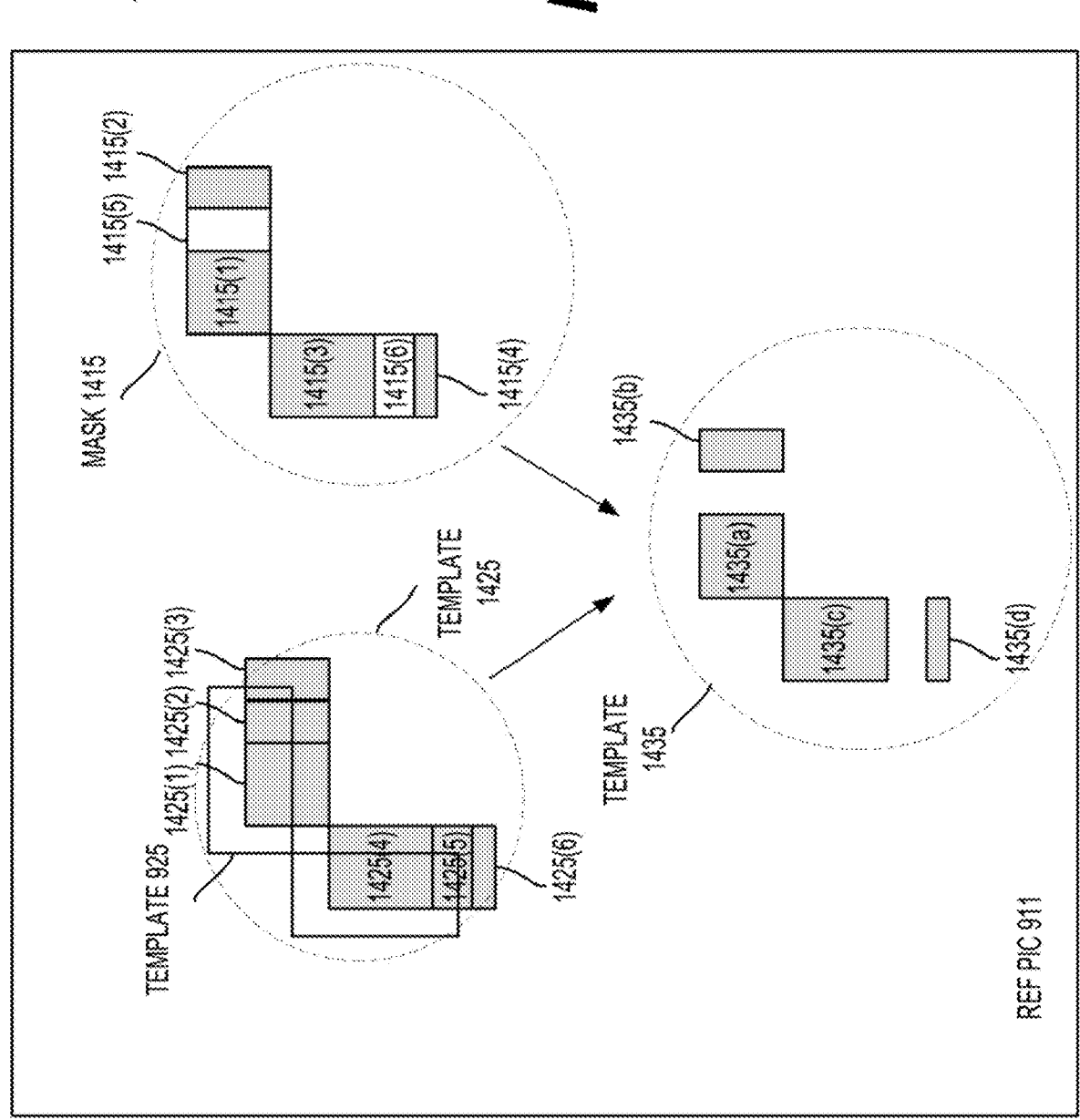
FIG. 13 shows an exemplary process to obtain a reference template in a reference picture.

FIG. 13 shows an exemplary process (1300) to obtain a reference template in a reference picture. In an embodiment, reference samples in an initial reference template (e.g., the template (925)) that corresponds to the initial template (e.g., (921)) of the current block (e.g., (901)) are located at sub-pixel positions in the reference picture (e.g., (911)). The template (925), the template (921), the current CU (901), and the reference picture (911) are described in FIG. 9. For purposes of clarity, the template (921) and the current CU (901) are not shown in FIG. 13. An intermediate reference template (1425) in the reference picture can be generated using an interpolation on the initial reference template (e.g., (925)).

A mask (1415) includes regions (1415(1))-(1415(4)) and regions (1415(5))-(1415(6)). In an example, pixels in the regions (1415(1))-(1415(4)) have a value of "1", and pixels in the regions (1415(5))-(1415(6)) have a value of "0". The regions (1415(1))-(1415(4)) can be referred to as non-zero regions, and the regions (1415(5))-(1415(6)) can be referred to as zero regions. In an example, a shape of the non-zero regions (1415(1))-(1415(4)) of the mask (1415) is identical to a shape of the current template (e.g., (1221)) of the current block. In an example, a size of the non-zero regions (1415(1))-(1415(4)) of the mask (1415) is identical to a size of the current template (e.g., (1221)) of the current block.

A reference template (1435) that corresponds to the current template (e.g., the current template (1221) in FIG. 12A) of the current block can be generated based on the intermediate reference template (1425) and the mask (1415). For example, the intermediate reference template (1425) includes sub-templates (1425(1))-(1425(6)). The non-zero regions (1415(1))-(1415(4)) in the mask (1415) correspond to the sub-templates (1425(1)), (1425(3)), (1425(4)), and (1425(6)). The reference template (1435) is generated by applying the mask (1415) to the intermediate reference template (1425). In an example, the reference template (1435) includes sub-templates (**1435(*a*))-(1435(*b*)). The sub-templates (1435(*a*))-(1435(*b*)) can correspond to the sub-templates (1425(1)), (1425(3)), (1425(4)), and (1425(6)). In an example, the sub-templates (1435(*a*))-(1435(*b*)) are the sub-templates (1425(1)), (1425(3)), (1425(4)), and (1425(6)**), respectively.

The mask (1415) can include additional non-zero region(s) that do not overlap with the template (925) where pixels in the additional non-zero region(s) have the value of "1". The mask (1415) can include additional zero region(s) that do not overlap with the template (925) where pixels in the additional zero region(s) have the value of "0". The additional non-zero region(s) and the additional zero region(s) do not affect the reference template (1435).

In an embodiment, when an intra coded block is in a top template area or a left template area in the current picture, the intra coded block may be excluded from the current template. The current template may be extended into another part of the current picture. A size of the current template may be increased.

In an embodiment, the sample(s) in the initial template (e.g., the template (921)) that are included in the intra coded block include (i) one or more left samples of the samples of one or more left neighboring blocks or (ii) one or more top samples of the samples of one or more top neighboring blocks. If the sample(s) in the initial template (e.g., the template (921)) includes the one or more left samples, the current template further includes one or more extended left samples that are adjacent to the samples of the one or more left neighboring blocks included in the current template. In an example, the one or more extended left samples are not included in an intra coded block in the current picture. If the sample(s) in the initial template includes the one or more top samples, the current template can further include one or more extended top samples that are adjacent to the samples of the one or more top neighboring blocks included in the current template. The one or more extended top samples are not included in an intra coded block in the current picture.

Figure 14:
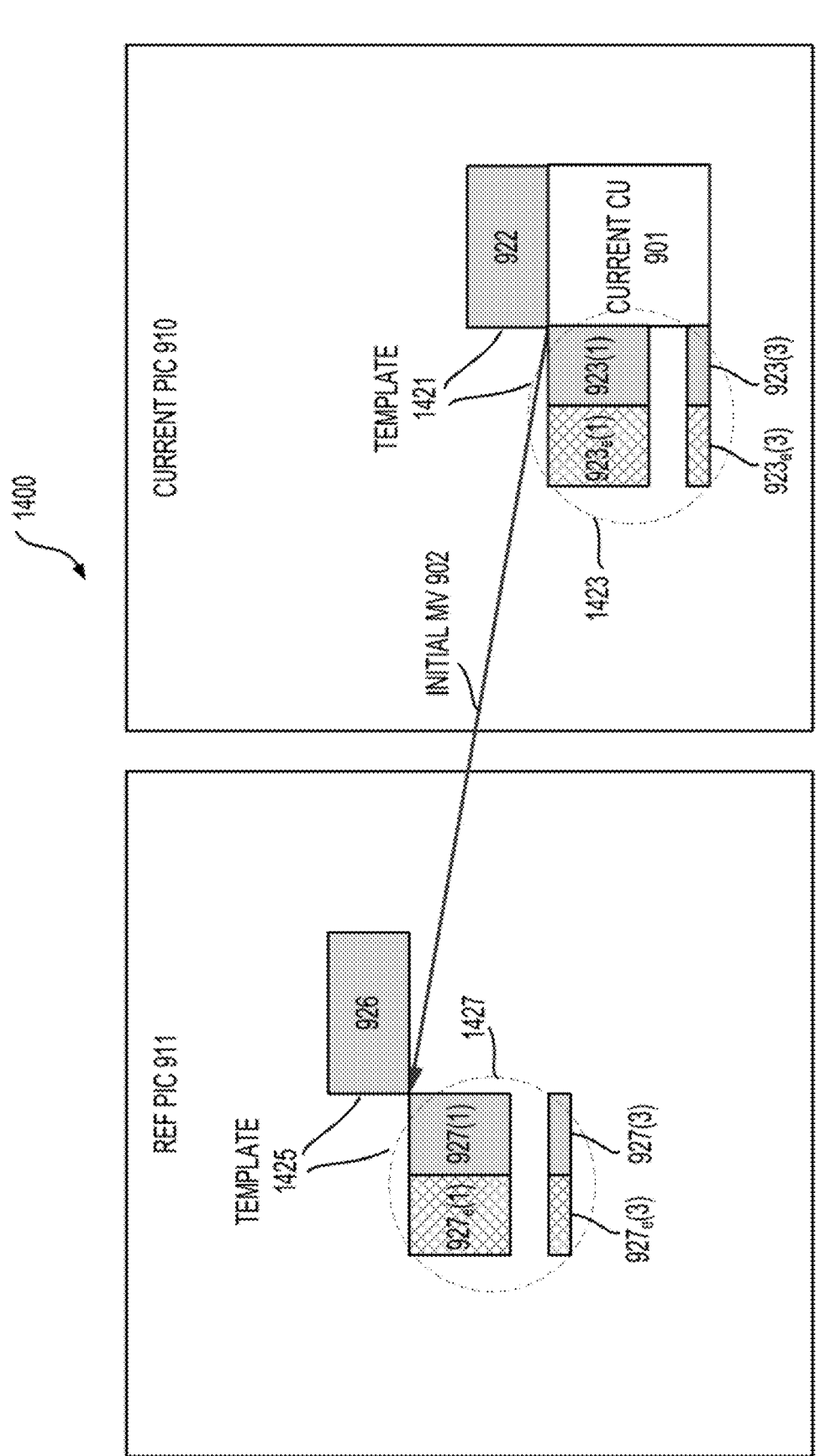
FIG. 14 shows an example of extending a current template in a TM.

FIG. 14 shows an example of extending a current template in TM (1400). The current CU (901), the initial MV (902), the current picture (910), the reference picture (911), the top template (922) and the sub-templates (923(1)) and (923(3)), and the top template (926) and the sub-templates (927(1)) and (927(3)) in FIG. 14 are described in FIGS. 9 and 11.

Referring to FIGS. 11 and 14, sample(s) in the sub-template (923(2)) of the initial template (921) are in intra coded block(s). Sample(s) in the top template (922) and the sub-templates (923(1)) and (923(3)) in the initial template (921) are not in intra coded block(s). A current template (1421) of the current CU (901) can include the top template (922) and the sub-templates (923(1)) and (923(3)). The current template (1421) can further include sub-templates (923_e_(1)) and (923_e_(3)) that are respective extensions of the sub-templates (923(1)) and (923(3)) that are in the current template (1421). The sub-template (923_e_(1)) is a left neighbor adjacent to the sub-template (923(1)). The sub-template (923_e_(1)) can include one or more extended left samples that are adjacent to sample(s) of the sub-template (923(1)). The sub-template (923_e_(3)) is a left neighbor adjacent to the sub-template (923(3)). The sub-template (923_e_(3)) can include one or more extended left samples that are adjacent to sample(s) of the sub-template (923(3)). In an example, samples in the sub-templates (923_e_(1)) and (923_e_(3)) are not included in intra coded block(s).

In an example, a number of samples in the current template (e.g., (1421)) is 150% of a number of samples in the initial template (e.g., (921)).

In an example, the number of samples in the current template (e.g., (1421)) is 200% of the number of samples in the initial template (e.g., (921)).

Descriptions with reference to FIG. 14 can be suitably adapted when a sub-template in the top template (922) is omitted from the current template.

FIG. 15 shows a flow chart outlining an encoding process (1500) according to an embodiment of the disclosure. In various embodiments, the process (1500) is executed by processing circuitry, such as the processing circuitry in the terminal devices (310), (320), (330) and (340), processing circuitry that performs functions of a video encoder (e.g., (403), (603), (703)), or the like. In some embodiments, the process (1500) is implemented in software instructions, thus when the processing circuitry executes the software instructions, the processing circuitry performs the process (1500). The process starts at (S1501), and proceeds to (S1510).

At (S1510), it is determined whether sample(s) in an initial template of a current block in a current picture is included in a block to be intra encoded. In an example, the block to be intra encoded is a spatial neighboring block of the current block. The initial template of the current block can include samples of one or more top neighboring blocks of the current block and/or samples of one or more left neighboring blocks of the current block. In an example, the block to be intra encoded has been intra encoded. In an example, the block to be intra encoded has not been intra encoded.

At (S1520), in response to a determination that sample(s) in the initial template is included in the block to be intra encoded, a motion vector (MV) of the current block can be determined based on (i) an initial MV of the current block without applying a template matching (TM) mode, or (ii) the initial MV of the current block and a current template that is generated based on the initial template and omits the sample(s) included in the block to be intra encoded.

In an embodiment, sample(s) in the initial template of the current block is determined to be included in the intra coded block. In this case, the MV can be determined based on the initial MV of the current block without applying the TM mode.

In an embodiment, the initial template of the current block includes an initial top template including the samples of one or more top neighboring blocks and an initial left template including the samples of one or more left neighboring blocks. Sample(s) in the initial template of the current block is determined to be included in the intra coded block. If the one or more left neighboring blocks of the current block do not include the intra coded block, the MV of the current block can be determined using the TM mode that is based on the initial MV and the current template consisting of the initial left template. If the one or more top neighboring blocks of the current block do not include the intra coded block, the MV of the current block can be determined using the TM mode that is based on the initial MV and the current template consisting of the initial top template.

In an embodiment, sample(s) in the initial template (e.g., (921)) of the current block is determined to be included in the intra coded block. In this case, the MV of the current block can be determined using the TM mode that is based on the initial MV and the current template (e.g., (1221) or (1321)) of the current block, such as described in FIGS. 12A-12B.

In an example, such as described in FIG. 14, the sample(s) in the initial template included in the intra coded block include (i) one or more left samples of one or more left neighboring blocks and/or (ii) one or more top samples of one or more top neighboring blocks. If the (s)sample(s) in the initial template includes the one or more left samples, the current template can further include one or more extended left samples that are adjacent to the samples of the one or more left neighboring blocks included in the current template. The one or more extended left samples are not included in an intra coded block in the current picture. If the (s)sample(s) in the initial template includes the one or more top samples, the current template further includes one or more extended top samples that are adjacent to the samples of the one or more top neighboring blocks included in the current template. The one or more extended top samples are not included in an intra coded block in the current picture. A number of samples in the current template can be larger than a number of samples in the initial template. The number of samples in the current template can be 150% or 200% of the number of samples in the initial template.

In an example, (s)interpolated sample(s) is generated by interpolation based on one or more samples in the current template. The interpolated sample(s) can correspond to (replace) sample(s) in the initial template that is included in the intra coded block. The current template of the current block can further include the interpolated sample(s).

In an example, reference samples in a reference template that corresponds to the current template of the current block are located at sub-pixel positions in a reference picture. An interpolated reference template in the reference picture can be generated using interpolation with a filter having less than four taps on the reference template. The MV of the current block can be determined using the TM mode that is based on the initial MV, the current template of the current block, and the interpolated reference template.

In an example, the reference template in the reference picture omits reference sample(s) in the reference picture that corresponds to the sample(s) in the initial template of the current block that is included in the intra coded block. A padded sample that corresponds to (replaces) one of the omitted reference sample(s) in the reference picture can be generated by copying a closest reference sample in the reference picture. The interpolated reference template in the reference picture can be generated by the interpolation based on the padded sample.

In an example, the reference template in the reference picture omits reference sample(s) that corresponds to the sample(s) in the initial template of the current block that are included in the intra coded block. An interpolated reference template in the reference picture can be generated by interpolation based on the omitted reference sample(s) in the reference picture.

In an example, reference samples in an initial reference template that corresponds to the initial template of the current block are located at sub-pixel positions in a reference picture. In this case, an intermediate reference template in the reference picture can be generated using an interpolation on the initial reference template. A reference template that corresponds to the current template of the current block can be generated based on the intermediate reference template and a mask. A shape of the mask can be determined based on the current template of the current block.

At (S1530), the current block can be encoded based on the determined MV.

At (S1540), prediction information of the current block can be encoded. In an example, the prediction information indicates the TM mode for the current block. In an example, the prediction information includes information indicating an initial MV (e.g., the initial MV (902)) that is used in the TM mode.

The process (1500) proceeds to (S1599), and terminates.

The process (1500) can be suitably adapted to various scenarios and steps in the process (1500) can be adjusted accordingly. One or more of the steps in the process (1500) can be adapted, omitted, repeated, and/or combined. Any suitable order can be used to implement the process (1500). Additional step(s) can be added.

FIG. 16 shows a flow chart outlining a decoding process (1600) according to an embodiment of the disclosure. In various embodiments, the process (1600) is executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1600) is implemented in software instructions, thus when the processing circuitry executes the software instructions, the processing circuitry performs the process (1600). The process starts at (S1601), and proceeds to (S1610).

At (S1610), prediction information of a current block in a current picture can be decoded from a video bitstream. The prediction information can indicate a template matching (TM) mode for the current block.

At (S1620), it is determined whether (s)sample(s) in an initial template (or a first template) of the current block is included in an intra coded block. In an example, the intra coded block is a spatial neighboring block of the current block. The initial template (e.g., the template (921)) of the current block can include samples of one or more top neighboring blocks of the current block and/or samples of one or more left neighboring blocks of the current block.

At (S1630), in an example, if (s) sample(s) in the initial template is determined to be included in an intra coded block, a motion vector (MV) of the current block can be determined based on an initial MV of the current block without applying the TM mode. For example, referring to FIG. 11, if sample(s) in the sub-template (922(2)) are included in intra coded block(s), the MV of the current block (e.g., the current CU (901)) can be determined based on the initial MV (902) of the current block without applying the TM mode.

Alternatively, in (S1630), if (s)sample(s) in the initial template is determined to be included in an intra coded block, the MV of the current block can be determined based on the initial MV of the current block and a current template (or a second template), such as described in FIGS. 11, 12A, and 12B. The current template can be generated based on the initial template and can omit the sample(s) in the initial template that is included in the intra coded block.

In an embodiment, the initial template of the current block includes an initial top template including samples of one or more top neighboring blocks and an initial left template including samples of one or more left neighboring blocks. Sample(s) in the initial template of the current block is determined to be included in an intra coded block. In this case, if the left neighboring blocks of the initial left template do not include an intra coded block, the MV of the current block can be determined using the TM mode that is based on the initial MV and the current template, which is the initial left template. If the one or more top neighboring blocks of the current block do not include the intra coded block, the MV of the current block can be determined using the TM mode that is based on the initial MV and the current template consisting of the initial top template.

In an embodiment, sample(s) in the initial template (e.g., (921)) of the current block is determined to be included in the intra coded block. In this case, the MV of the current block can be determined using the TM mode that is based on the initial MV and the current template (e.g., (1221) or (1321)) of the current block, such as described in FIGS. 12A-12B.

In an example, such as described in FIG. 14, the sample(s) in the initial template included in the intra coded block include (i) one or more left samples of one or more left neighboring blocks and/or (ii) one or more top samples of one or more top neighboring blocks. If the sample(s) in the initial template includes the one or more left samples, the current template can further include one or more extended left samples that are adjacent to the samples of the one or more left neighboring blocks included in the current template. The one or more extended left samples are not included in an intra coded block in the current picture. If the sample(s) in the initial template includes the one or more top samples, the current template further includes one or more extended top samples that are adjacent to the samples of the one or more top neighboring blocks included in the current template. The one or more extended top samples are not included in an intra coded block in the current picture. A number of samples in the current template can be larger than a number of samples in the initial template. The number of samples in the current template can be 150% or 200% of the number of samples in the initial template.

In an example, (s)interpolated sample(s) is generated by interpolation based on one or more samples in the current template. The interpolated sample(s) can correspond to (replace) the sample(s) in the initial template that are included in an intra coded block. The current template of the current block can further include the (s) interpolated sample(s).

In an example, reference samples in a reference template that corresponds to the current template of the current block are located at sub-pixel positions in a reference picture. In this case, an interpolated reference template in the reference picture can be generated using interpolation with a filter having less than four taps on the reference template. The MV of the current block can be determined using the TM mode that is based on the initial MV, the current template of the current block, and the interpolated reference template.

In an example, the reference template in the reference picture omits (s)reference sample(s) that corresponds to sample(s) in the initial template of the current block that are included in an intra coded block. A padded sample that corresponds to (replaces) one of the omitted reference samples in the reference picture can be generated by copying a closest reference sample in the reference picture. The interpolated reference template in the reference picture can be generated by the interpolation based on the padded sample.

In an example, the reference template in the reference picture omits reference sample(s) that corresponds to sample(s) in the initial template of the current block that are included in an intra coded block. In this case, an interpolated reference template in the reference picture can be generated by interpolation based on the omitted reference sample in the reference picture.

In an example, reference samples in an initial reference template that corresponds to the initial template of the current block are located at sub-pixel positions in a reference picture. An intermediate reference template in the reference picture can be generated using interpolation on the initial reference template. A reference template that corresponds to the current template of the current block can be generated based on the intermediate reference template and a mask. A shape of the mask can be determined based on the current template of the current block.

At (S1640), the current block can be reconstructed based on the determined MV.

The process (1600) proceeds to (S1699), and terminates.

The process (1600) can be suitably adapted to various scenarios and steps in the process (1600) can be adjusted accordingly. One or more of the steps in the process (1600) can be adapted, omitted, repeated, and/or combined. Any suitable order can be used to implement the process (1600). Additional step(s) can be added.

In an embodiment, whether the at least one sample in the initial template (or a first template) of the current block is included in the intra coded block that is a spatial neighboring block of the current block is determined. The first template of the current block can include one or more samples of (1) the one or more top neighboring blocks of the current block and (2) the one or more left neighboring blocks of the current block. In an example, the one or more top neighboring blocks are top neighboring blocks. In an example, the one or more left neighboring blocks are left neighboring blocks. In response to a determination that the at least one sample in the first template is included in the intra coded block, the at least one sample can be excluded from the first template to generate the current template (or a second template) for the current block. The MV of the current block can be determined based on the second template for the current block.

In an example, in response to (i) the determination that the at least one sample in the first template is included in the intra coded block and (ii) the TM mode being applied to the current block, the at least one sample can be excluded from the first template to generate the second template for the current block.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 17 shows a computer system (1700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 17:
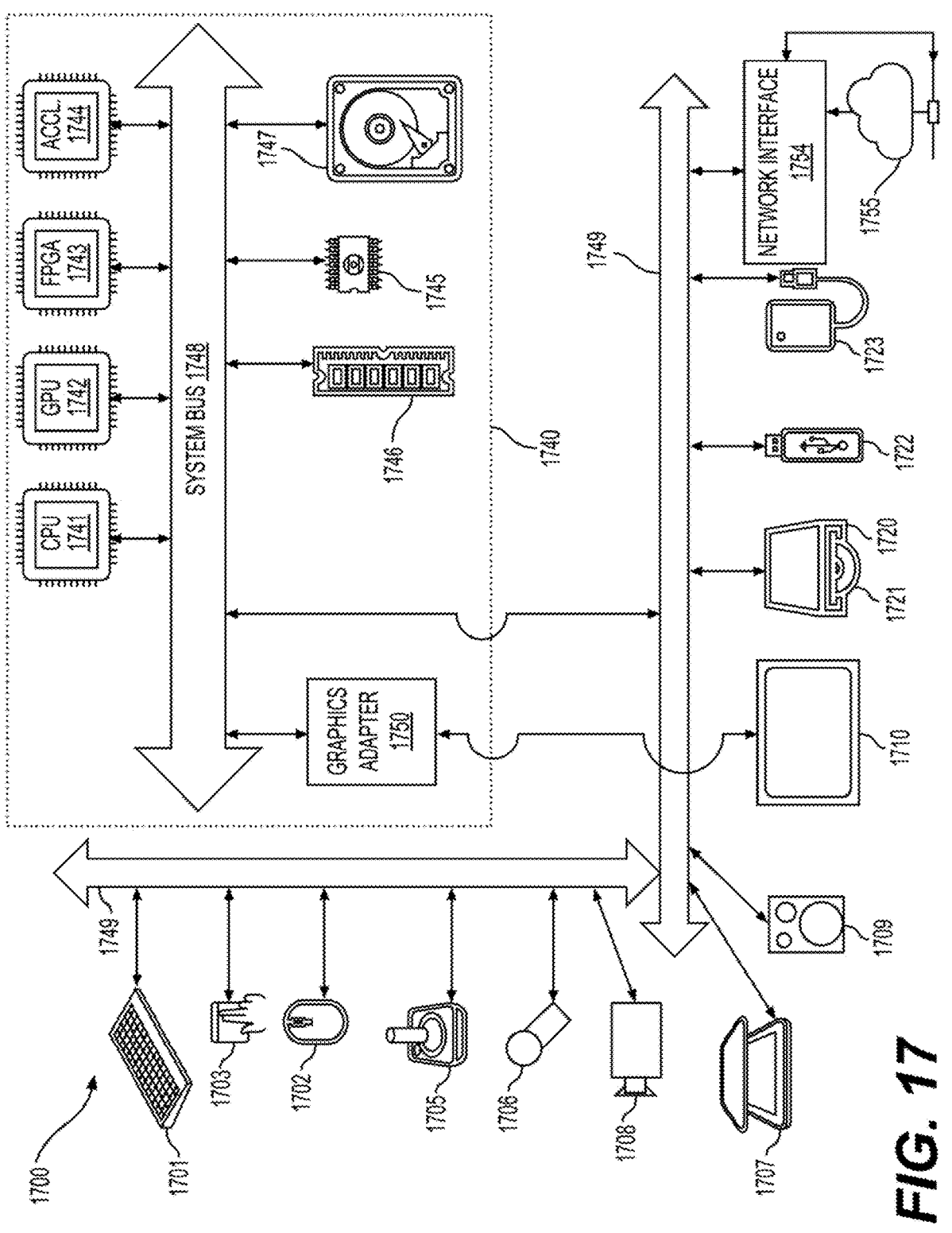
FIG. 17 is a schematic illustration of a computer system in accordance with an embodiment.

The components shown in FIG. 17 for computer system (1700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1700).

Computer system (1700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1701), mouse (1702), trackpad (1703), touch-screen (1710), data-glove (not shown), joystick (1705), microphone (1706), scanner (1707), camera (1708).

Computer system (1700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1710), data-glove (not shown), or joystick (1705), but there can also be tactile feedback devices that do not serve as input devices), audio output devices (such as: speakers (1709), headphones (not depicted)), visual output devices (such as screens (1710) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1700) can also include human accessible storage devices and their associated media such as optical media including CD/DVD ROM/RW (1720) with CD/DVD or the like media (1721), thumb-drive (1722), removable hard drive or solid state drive (1723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1700) can also include an interface (1754) to one or more communication networks (1755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1749) (such as, for example USB ports of the computer system (1700)); others are commonly integrated into the core of the computer system (1700) by attachment to a system bus as described below (for example Ethernet interface into a PC computer system or cellular network interface into a smartphone computer system). Using any of these networks, computer system (1700) can communicate with other entities. Such communication can be uni-directional, receive only (for example, broadcast TV), uni-directional send-only (for example CANbus to certain CANbus devices), or bidirectional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1740) of the computer system (1700).

The core (1740) can include one or more Central Processing Units (CPU) (1741), Graphics Processing Units (GPU) (1742), specialized programmable processing units in the form of Field Programmable Gate Areas (FPGA) (1743), hardware accelerators for certain tasks (1744), graphics adapters (1750), and so forth. These devices, along with Read-only memory (ROM) (1745), Random-access memory (1746), internal mass storage such as internal non-user accessible hard drives, SSDs, and the like (1747), may be connected through a system bus (1748). In some computer systems, the system bus (1748) can be accessible in the form of one or more physical plugs to enable extensions by additional CPUs, GPU, and the like. The peripheral devices can be attached either directly to the core's system bus (1748), or through a peripheral bus (1749). In an example, the screen (1710) can be connected to the graphics adapter (1750). Architectures for a peripheral bus include PCI, USB, and the like.

CPUs (1741), GPUs (1742), FPGAs (1743), and accelerators (1744) can execute certain instructions that, in combination, can make up the aforementioned computer code. That computer code can be stored in ROM (1745) or RAM (1746). Transitional data can be stored in RAM (1746), whereas permanent data can be stored for example, in the internal mass storage (1747). Fast storage and retrieve to any of the memory devices can be enabled through the use of cache memory, that can be closely associated with one or more CPU (1741), GPU (1742), mass storage (1747), ROM (1745), RAM (1746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1700), and specifically the core (1740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1740) that are of non-transitory nature, such as core-internal mass storage (1747) or ROM (1745). The software implementing various embodiments of the present disclosure can be stored in such devices and executed by core (1740). A computer-readable medium can include one or more memory devices or chips, according to particular needs. The software can cause the core (1740) and specifically the processors therein (including CPU, GPU, FPGA, and the like) to execute particular processes or particular parts of particular processes described herein, including defining data structures stored in RAM (1746) and modifying such data structures according to the processes defined by the software. In addition or as an alternative, the computer system can provide functionality as a result of logic hardwired or otherwise embodied in a circuit (for example: accelerator (1744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC))

storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
R-D: Rate-Distortion
While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. An apparatus for video decoding, comprising:
processing circuitry configured to:
    decode prediction information of a current block in a current picture from a bitstream, the prediction information indicating a template matching (TM) mode for the current block;
    determine whether at least one sample of a plurality of samples in a first template of the current block is included in an intra coded block that is a spatial neighboring block of the current block, the first template of the current block including one or more samples of (1) top neighboring blocks of the current block and (2) left neighboring blocks of the current block;

when (i) the at least one sample in the first template is included in the intra coded block and (ii) the TM mode is applied to the current block, exclude the at least one sample of the plurality of samples from the first template to generate a second template for the current block;
    determine a motion vector (MV) of the current block based on the second template for the current block; and
    reconstruct the current block based on the determined MV.

2. The apparatus of claim 1, wherein
the at least one sample in the first template of the current block is determined to be included in the intra coded block; and
the processing circuitry is configured to determine the MV based on an initial MV of the current block without applying the TM mode.

3. The apparatus of claim 1, wherein
the first template of the current block includes an initial top template including samples of the top neighboring blocks and an initial left template including samples of the left neighboring blocks;
the at least one sample in the first template of the current block is determined to be included in the intra coded block;
when the left neighboring blocks of the current block does not include the intra coded block, the processing circuitry is configured to determine the MV of the current block using the TM mode that is based on an initial MV and the second template consisting of the initial left template; and
when the top neighboring blocks of the current block does not include the intra coded block, the processing circuitry is configured to determine the MV of the current block using the TM mode that is based on the initial MV and the second template consisting of the initial top template.

4. The apparatus of claim 1, wherein
the at least one sample in the first template of the current block is determined to be included in the intra coded block; and
the processing circuitry is configured to determine the MV of the current block using the TM mode that is based on an initial MV and the second template of the current block.

5. The apparatus of claim 4, wherein
the processing circuitry is configured to generate at least one interpolated sample by interpolation based on one or more samples in the second template, the at least one interpolated sample corresponding to the at least one sample in the first template that is included in the intra coded block; and
the second template of the current block further includes the at least one interpolated sample.

6. The apparatus of claim 4, wherein
reference samples in a reference template that corresponds to the second template of the current block are located at sub-pixel positions in a reference picture; and
the processing circuitry is configured to:
    generate an interpolated reference template in the reference picture using an interpolation with a filter having less than four taps on the reference template; and determine the MV of the current block using the TM mode that is based on the initial MV, the second template of the current block, and the interpolated reference template.

7. The apparatus of claim 4, wherein the at least one sample in the first template included in the intra coded block includes (i) one or more left samples of samples of the left neighboring blocks or (ii) one or more top samples of samples of the top neighboring blocks, when the at least one sample in the first template includes the one or more left samples, the second template further includes one or more extended left samples that are adjacent to the samples of the left neighboring blocks included in the second template, the one or more extended left samples not being included in an intra coded block in the current picture, and when the at least one sample in the first template includes the one or more top samples, the second template further includes one or more extended top samples that are adjacent to the samples of the top neighboring blocks included in the second template, the one or more extended top samples not being included in an intra coded block in the current picture.

8. A method for video encoding, comprising:

determining whether at least one sample of a plurality of samples in a first template of a current block in a current picture is included in an intra coded block that is a spatial neighboring block of the current block, the first template of the current block including one or more samples of (1) top neighboring blocks of the current block and (2) left neighboring blocks of the current block;

when (i) the at least one sample in the first template is included in the intra coded block and (ii) a template matching (TM) mode is applied to the current block, excluding the at least one sample of the plurality of samples from the first template to generate a second template for the current block;

determining a motion vector (MV) of the current block based on the second template for the current block; and encoding the current block in a bitstream based on the determined MV.

9. The method of claim 8, wherein the at least one sample in the first template of the current block is determined to be included in the intra coded block; and the determining the MV includes determining the MV based on an initial MV of the current block without applying the TM mode.

10. The method of claim 8, wherein the first template of the current block includes an initial top template including samples of the top neighboring blocks and an initial left template including samples of the left neighboring blocks;

the at least one sample in the first template of the current block is determined to be included in the intra coded block;

when the left neighboring blocks of the current block does not include the intra coded block, the determining the MV includes determining the MV of the current block using the TM mode that is based on an initial MV and the second template consisting of the initial left template; and when the top neighboring blocks of the current block does not include the intra coded block, the determining the MV includes determining the MV of the current block using the TM mode that is based on the initial MV and the second template consisting of the initial top template.

11. The method of claim 8, wherein the at least one sample in the first template of the current block is determined to be included in the intra coded block; and the determining the MV includes determining the MV of the current block using the TM mode that is based on an initial MV and the second template of the current block.

12. The method of claim 11, wherein the method includes generating at least one interpolated sample by interpolation based on one or more samples in the second template, the at least one interpolated sample corresponding to the at least one sample in the first template that is included in the intra coded block; and the second template of the current block further includes the at least one interpolated sample.

13. The method of claim 11, wherein reference samples in a reference template that corresponds to the second template of the current block are located at sub-pixel positions in a reference picture;

the method further includes generating an interpolated reference template in the reference picture using an interpolation with a filter having less than four taps on the reference template; and the determining the MV includes determining the MV of the current block using the TM mode that is based on the initial MV, the second template of the current block, and the interpolated reference template.

14. The method of claim 13, wherein the reference template in the reference picture omits at least one reference sample in the reference picture that corresponds to the at least one sample in the first template of the current block that is included in the intra coded block;

the method includes generating a padded sample that corresponds to one of the omitted at least one reference sample in the reference picture by copying a closest reference sample in the reference picture; and the generating the interpolated reference template includes generating the interpolated reference template in the reference picture by the interpolation based on the padded sample.

15. The method of claim 13, wherein the reference template in the reference picture omits at least one reference sample in the reference picture that corresponds to the at least one sample in the first template of the current block that is included in the intra coded block; and the generating the interpolated reference template includes generating the interpolated reference template in the reference picture by the interpolation based on the omitted at least one reference sample in the reference picture.

16. The method of claim 11, wherein reference samples in an initial reference template that corresponds to the first template of the current block are located at sub-pixel positions in a reference picture; and the method further includes:

generating an intermediate reference template in the reference picture using an interpolation on the initial reference template; and generating a reference template that corresponds to the second template of the current block based on the intermediate reference template and a mask, a shape of the mask being determined based on the second template of the current block.

17. The method of claim 11, wherein the at least one sample in the first template included in the intra coded block includes (i) one or more left samples of samples of the left neighboring blocks or (ii) one or more top samples of samples of the top neighboring blocks, when the at least one sample in the first template includes the one or more left samples, the second template further includes one or more extended left samples that are adjacent to the samples of the left neighboring blocks included in the second template, the one or more extended left samples not being included in an intra coded block in the current picture, and when the at least one sample in the first template includes the one or more top samples, the second template further includes one or more extended top samples that are adjacent to the samples of the top neighboring blocks included in the second template, the one or more extended top samples not being included in an intra coded block in the current picture.

18. The method of claim 17, wherein a number of samples in the second template is 150% of a number of samples in the first template.

19. The method of claim 17, wherein a number of samples in the second template is 200% of a number of samples in the first template.

20. A non-transitory computer-readable storage medium storing instructions which when executed by a processor cause the processor to perform a method of encoding a video bitstream comprising:

determining whether at least one sample of a plurality of samples in a first template of a current block in a current picture is included in an intra coded block that is a spatial neighboring block of the current block, the first template of the current block including one or more samples of (1) top neighboring blocks of the current block and (2) left neighboring blocks of the current block;

when (i) the at least one sample in the first template is included in the intra coded block and (ii) a template matching (TM) mode is applied to the current block, excluding the at least one sample of the plurality of samples from the first template to generate a second template for the current block;

determining a motion vector (MV) of the current block based on the second template for the current block;

encoding the current block in the video bitstream based on the determined MV; and transmitting the video bitstream.

* * * * *